(12) United States Patent
Kato

(10) Patent No.: US 7,229,380 B2
(45) Date of Patent: Jun. 12, 2007

(54) POWER TRANSMISSION DEVICE AND PLATE-MATERIAL FEEDING APPARATUS INCORPORATING THEREINTO THE SAME

(75) Inventor: Heizaburo Kato, Kikugawa (JP)

(73) Assignee: Sankyo Seisakusho Co., Tokyo (JP)

(*) Notice: Subject to any disclaimer, the term of this patent is extended or adjusted under 35 U.S.C. 154(b) by 220 days.

(21) Appl. No.: 11/120,109

(22) Filed: May 2, 2005

(65) Prior Publication Data

US 2005/0261105 A1 Nov. 24, 2005

(30) Foreign Application Priority Data

May 21, 2004 (JP) ............................ 2004-151653

(51) Int. Cl.
*F16H 57/08* (2006.01)
*B65H 20/00* (2006.01)

(52) U.S. Cl. ................. 475/331; 475/343; 226/162

(58) Field of Classification Search ............... 475/331, 475/343, 254; 226/51, 162
See application file for complete search history.

(56) References Cited

U.S. PATENT DOCUMENTS

| 3,401,580 | A | | 9/1968 | Sigg |
| 4,282,779 | A | * | 8/1981 | Kato ........................... 74/822 |
| 4,776,505 | A | | 10/1988 | Kato |
| 4,819,850 | A | | 4/1989 | Kato |
| 4,872,289 | A | * | 10/1989 | Yukawa et al. ............... 451/67 |

FOREIGN PATENT DOCUMENTS

| EP | 0794360 | 9/1997 |
| JP | A-63-82271 | 4/1988 |
| JP | U-63-170039 | 11/1988 |
| JP | U-7-26034 | 5/1995 |
| JP | A-11-77199 | 3/1999 |

* cited by examiner

*Primary Examiner*—Tisha Lewis
(74) *Attorney, Agent, or Firm*—Harness, Dickey & Pierce, P.L.C.

(57) ABSTRACT

A power transmission device is capable of correctly adjusting relative positions of two shafts in a direction of rotation even when the shafts are rotationally driven, and comprises a hollow, outer shaft, to one end of which a drive gear is fixed, an inner shaft, to one end of which a carrier is fixed, and a planetary gear mechanism. The planetary gear mechanism comprises a sun gear, planetary gears supported on a carrier, and a ring gear having internal teeth and external teeth, the internal teeth engaging with the planetary gears. A first gear and a second gear on an input shaft, respectively, engage with outer teeth of the drive gear and the ring gear. When the sun gear is made stationary and the input shaft is rotationally driven, the outer shaft and the inner shaft are rotated with the same number of revolutions in the same direction. When the sun gear is rotated, a position of the inner shaft in the direction of rotation is adjusted relative to the outer shaft.

11 Claims, 16 Drawing Sheets

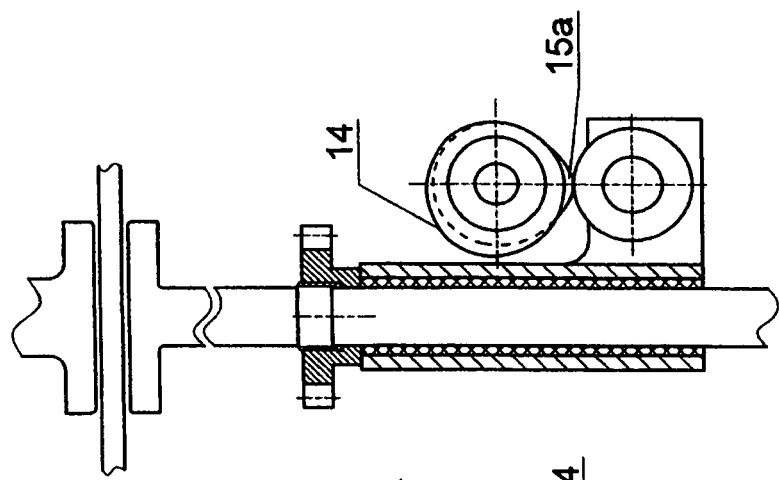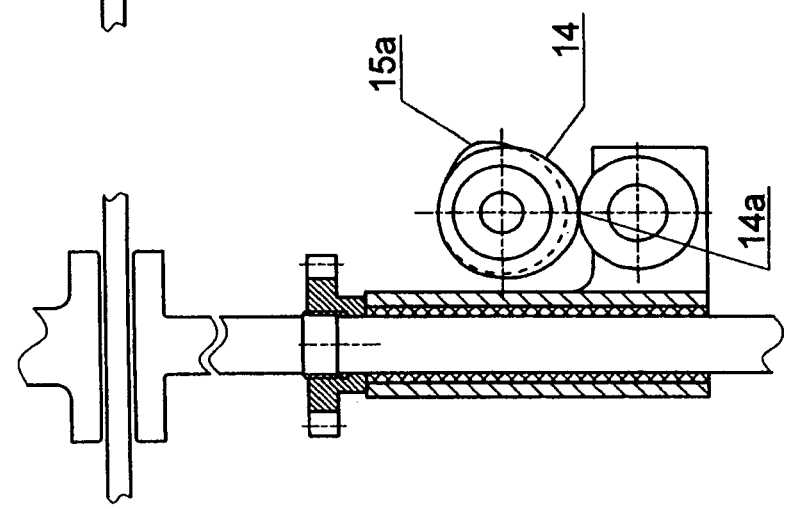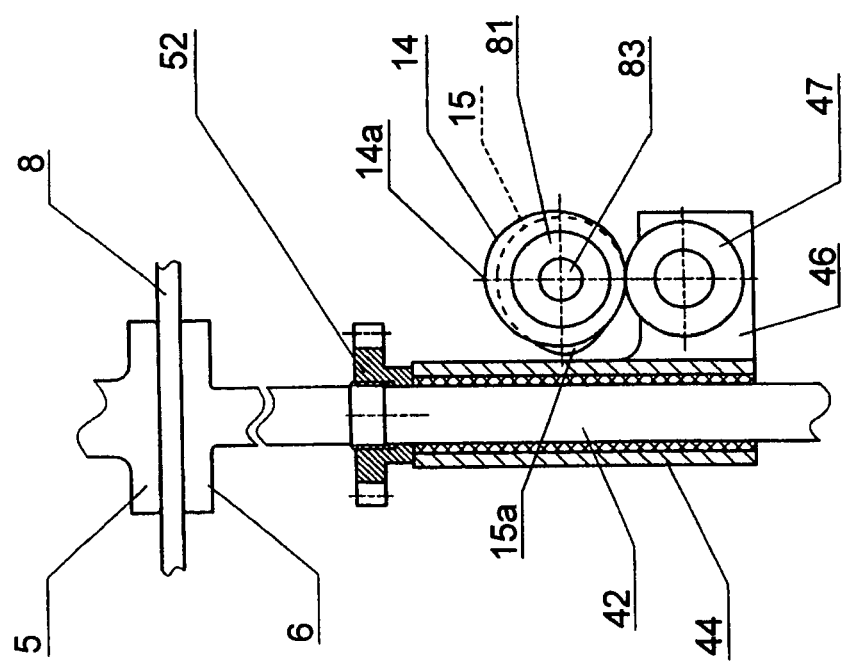

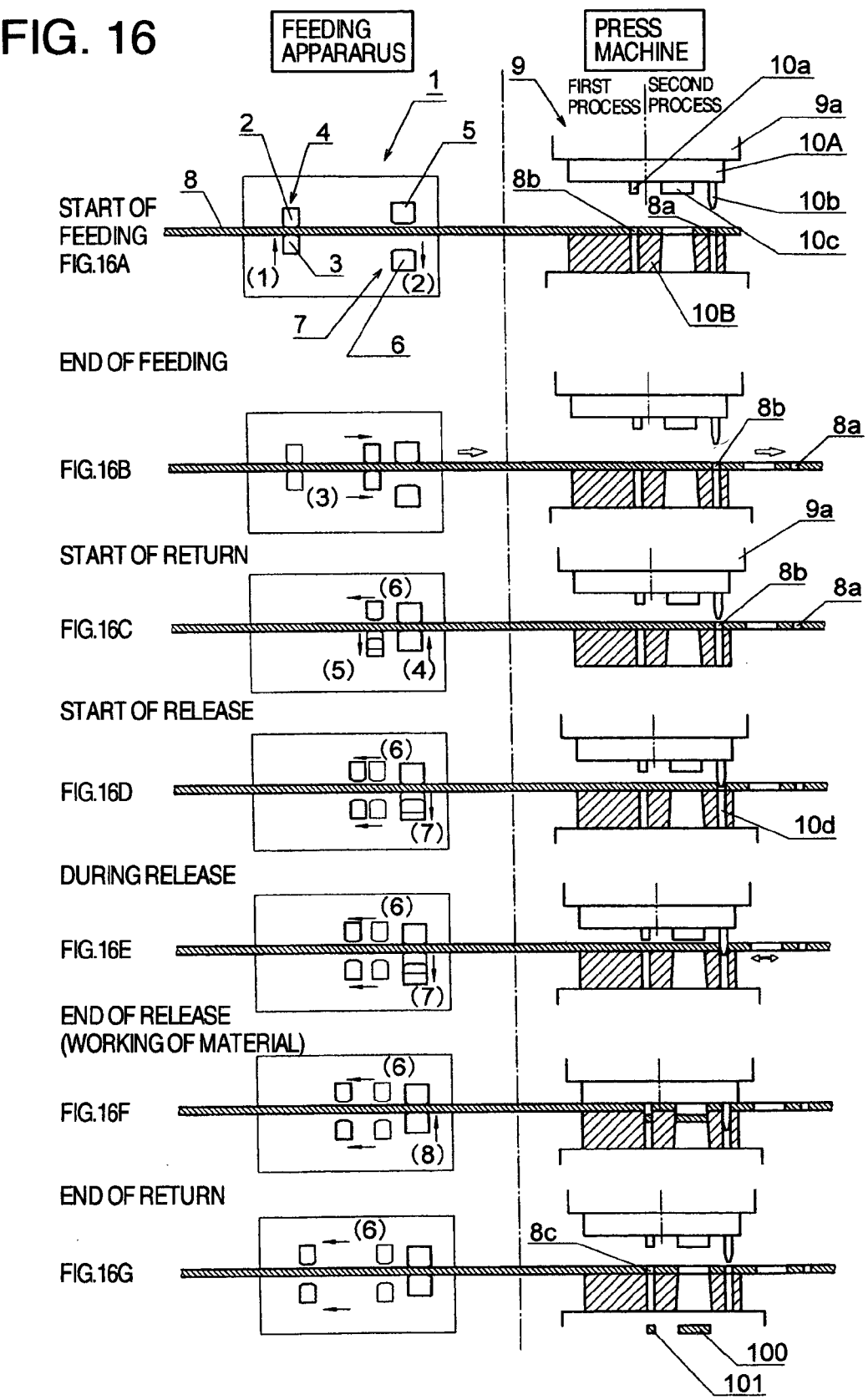

POWER TRANSMISSION DEVICE AND PLATE-MATERIAL FEEDING APPARATUS INCORPORATING THEREINTO THE SAME

BACKGROUND OF THE INVENTION

The present invention relates to a power transmission device constructed to be able to rotationally drive a hollow, outer shaft and an inner shaft put in the concentric relationship with the outer shaft together and to adjust a rotational position (or phase) of the inner shaft relative to the outer shaft, and a plate-material feeding apparatus that incorporates thereinto the power transmission device.

For example, JP-U-63-170039 describes a power transmission device constructed in a manner described above, and a plate-material feeding apparatus that incorporates thereinto the device.

The plate-material feeding apparatus described in JP-U-63-170039 comprises a pair of rolls that interpose therebetween a plate material to intermittently feed the same in constant-length steps to a press machine, a roll release device that moves the both rolls in a direction away from each other, while no plate material is fed to the press machine, to release a clamping force exerted on a plate material by the both rolls, and a plate-material braking device having a pair of braking pieces that interposingly fix a plate material during a period, during which an operation of feeding a plate material to the press machine is not performed.

The plate-material feeding apparatus described in JP-U-63-170039 uses a pair of braking pieces to interposingly fix a plate material when press working of a plate material is performed in the press machine. With some metal mold devices for press machines, however, positioning of a plate material on a metal mold device can be highly accurately performed by providing a pilot pin on an upper metal mold to make the same project downward therefrom, and inserting the pilot pin into a positioning hole formed beforehand on the plate material just before upper and lower metal molds are put together and press working is performed.

For use as a device that feeds a plate material to such press machine, the plate-material feeding apparatus described in JP-U-63-170039 is constructed to temporarily release clamping of a plate material by the pair of braking pieces just before the plate material having been fed to a press machine is subjected to press working.

The power transmission device incorporated into the plate-material feeding apparatus comprises a hollow outer shaft having a first cam integrally fitted thereon, and an inner shaft having a second cam integrally fitted thereon, the both shafts being rotationally driven together. The first cam actuates the braking pieces so as to interposingly fix a plate material while the operation of feeding a plate material to the press machine is not performed, and the second cam actuates the braking pieces so as to temporarily release a plate material just before the press working of the plate material. Timing, in which the braking pieces temporarily releases a plate material, is adjusted by rotating the inner shaft relative to the outer shaft to regulate a rotational position (that is, phase) of the second cam relative to the first cam.

JP-U-7-26034 describes a material feeding apparatus that feeds a material to a press machine of the type described above, and a power transmission device incorporated thereinto.

In the power transmission device, a first shaft that rotates in synchronism with the operation of the press machine, and a second shaft that drives a cam similar to the second cam to temporarily release a plate material are connected to each other through two planetary gear mechanisms. The planetary gear mechanisms comprise a first sun gear fixed to an inner end of the first shaft, a plurality of first planetary gears that engage with the first sun gear, a second sun gear fixed to an inner end of the second shaft, a plurality of second planetary gears that engage with the second sun gear, and a ring gear having inner teeth that engage with the first and second planetary gears. With the device, when the first shaft is rotationally driven, the second shaft is rotationally driven through the first sun gear, the first planetary gears, the ring gear, the second planetary gears, and the second sun gear. Also, the first shaft and the second shaft can be adjusted in relative rotational positions by using a worm gear to revolve the first planetary gears around the first sun gear.

JP-A-11-77199 also describes a material feeding apparatus that feeds a material to a press machine of the type described above, and a power transmission device incorporated thereinto. The power transmission device described in JP-A-11-77199 is the same as that described in JP-U-7-26034 except that a ring gear is omitted, and constructed to use two planetary gear mechanisms and a worm gear.

The plate-material feeding apparatuses described in JP-U-63-170039, JP-U-7-26034, and JP-A-11-77199 is of a type commonly called a roll feed, in which a plate material is fed by a pair of rolls, while a plate-material feeding apparatus commonly called a gripper feed is also known (see, for example, JP-A-63-82271).

The gripper feed described in JP-A-63-82271 includes a first gripper device having a first stationary upper gripper and a vertically movable, first movable lower gripper interposing therebetween a plate material to intermittently feed the same to a working machine such as a press machine, etc. the gripper feed being constructed to lift a second movable lower gripper, while the operation of feeding a plate material to the working machine is not performed, to have the second movable lower gripper and a second stationary upper gripper interposingly fixing a plate material.

With the power transmission device described in JP-A-63-82271, the inner shaft is rotated relative to the outer shaft to be regulated relative to the outer shaft in position in a direction of rotation, and after the regulation, a clamp screw is used to fix the outer shaft and the inner shaft in a manner to make them non-rotatable relative to each other. Accordingly, there is involved a problem that the regulating work cannot be performed in the operation of the plate-material feeding apparatus and the power transmission device, during which the outer shaft and the inner shaft are rotationally driven.

With the power transmission device described in JP-U-7-26034, the first shaft and the second shaft are adjusted in relative rotational positions by revolving the first planetary gears around the first sun gear, so that it is possible to perform the regulating work also while the power transmission device operates, that is, the first shaft and the second shaft are rotationally driven.

However, the power transmission device incorporates thereinto two planetary gear mechanisms and also needs a worm gear that revolves the first planetary gears around the sun gear. The construction using many gears in this manner is complex and involves a problem that backlash of the gears worsen accuracy in regulation.

The power transmission device described in JP-A-11-77199 involves a similar problem to the above.

BRIEF SUMMARY OF THE INVENTION

It is an object of the invention to solve the problems in the related art and to provide a power transmission device that is simple in construction and can correctly adjust relative rotating positions of two shafts, and a plate-material feeding apparatus that incorporates thereinto the power transmission device.

In order to solve the problem, the invention provides a power transmission device comprising a hollow, outer shaft, to one end of which a drive gear is fixed, an inner shaft extending through a drive gear and the outer shaft in the coaxial relationship with the outer shaft and having a carrier fixed to an extension thereof from the drive gear, a planetary gear mechanism comprising a sun gear arranged in the coaxial relationship with the inner shaft, a plurality of planetary gears supported rotatably on the carrier to engage with the sun gear, and a ring gear having internal teeth and external teeth, the internal teeth engaging with the planetary gears, and an input shaft having a first gear that engages with the drive gear, and a second gear that engages with the external teeth of the ring gear, the arrangement being such that the outer shaft and the inner shaft are rotated with the same number of revolutions in the same direction when the sun gear is kept stationary and the input shaft is rotationally driven, and that a position of the inner shaft in a direction of rotation is adjusted relative to the outer shaft when the sun gear is rotated.

Also, the invention provides a plate-material feeding apparatus comprising a first gripper device having a first stationary upper gripper and a vertically movable, first movable lower gripper interposing therebetween a plate material to intermittently feed the same to a press machine, a second gripper device that lifts a second movable lower gripper during a period of time, in which the operation of feeding a plate material to the press machine is not performed, to have the second movable lower gripper and a second stationary upper gripper interposingly fixing a plate material, and that lowers the second movable lower gripper to temporarily release the plate material just before the plate material fed to the press machine is subjected to press working, and a power transmission device having a first cam and a second cam to cause the lifting and lowering of the second movable lower gripper, respectively, and wherein the power transmission device comprises a hollow, outer shaft, to one end of which a drive gear is fixed, and on which the first cam is fitted integrally, an inner shaft extending through the drive gear and the outer shaft in the coaxial relationship with the outer shaft and having a carrier fixed to an extension thereof from the drive gear, the second cam being fitted integrally on an extension thereof from the outer shaft, a planetary gear mechanism comprising a sun gear arranged in the coaxial relationship with the inner shaft, a plurality of planetary gears supported rotatably on the carrier to engage with the sun gear, and a ring gear having internal teeth and external teeth, the internal teeth engaging with the planetary gears, and an input shaft having a first gear that engages with the drive gear, and a second gear that engages with the external teeth of the ring gear, the arrangement being such that the outer shaft and the inner shaft are rotated with the same number of revolutions in the same direction when the sun gear is kept stationary and the input shaft is rotationally driven, and that timing, in which the second cam lowers the second movable lower gripper, is adjusted when the sun gear is rotated to adjust a position of the inner shaft in a direction of rotation relative to the outer shaft.

In the power transmission device according to the invention, when the sun gear is rotated, the planetary gears revolve around the sun gear and the input shaft is rotated through the carrier whereby a position of the inner shaft in a direction of rotation is adjusted relative to the outer shaft. Such adjustment can be made also in the operation of the power transmission device, during which the outer shaft and the inner shaft are rotationally driven.

The power transmission device is constructed to incorporate thereinto a single planetary gear mechanism comprising a sun gear, planetary gears, and a ring gear, and rotation of the sun gear causes the planetary gears to revolve around the sun gear. Accordingly, there is not caused such a problem as in the apparatuses described in JP-U-7-26034 and JP-A-11-77199, into which two planetary gear mechanisms are incorporated and in which a worm gear serving as an additional mechanism for revolution of planetary gears is provided.

In the plate-material feeding apparatus according to the invention, a first cam that lifts the second movable lower gripper is fitted integrally on the outer shaft of the power transmission device constructed in the above manner, and a second cam that lowers the second movable lower gripper to temporarily release a plate material is fitted integrally on the inner shaft. Accordingly, timing, in which the second cam lowers the second movable lower gripper, can be highly accurately adjusted by rotating the sun gear of the power transmission device to rotate the inner shaft, and such adjustment can be made also in the operation of the plate-material feeding apparatus.

According to an embodiment of the power transmission device of the invention, a first cam is fitted integrally onto the outer shaft and a second cam is fitted integrally onto that portion of the inner shaft, which projects from the outer shaft. With such construction, timing, in which the mechanism actuated by the first cam and the second cam operates, can be adjusted by rotating the sun gear to rotate the inner shaft relative to the outer shaft.

According to a further embodiment of the power transmission device of the invention, there is provided a rotationally operated shaft integral with the sun gear to project from a center thereof in an opposite direction to and in the coaxial relationship with the inner shaft. With such construction, a position of the inner shaft in a direction of rotation can be adjusted relative to the outer shaft only by rotating the rotationally operated shaft.

BRIEF DESCRIPTION OF THE DRAWINGS

FIGS. 10A, 10B, and 10C are views illustrating the operative relationship between first and second cams of the power transmission device and a second movable, lower gripper of the material feeding apparatus;

FIGS. 16A, 16B, 16C, 16D, 16E, 16F, and 16G are schematic views illustrating the relationship between the feeding action of the material feeding apparatus and the operation of a press machine.

DETAILED DESCRIPTION OF THE PREFERRED EMBODIMENTS

Figure 1:
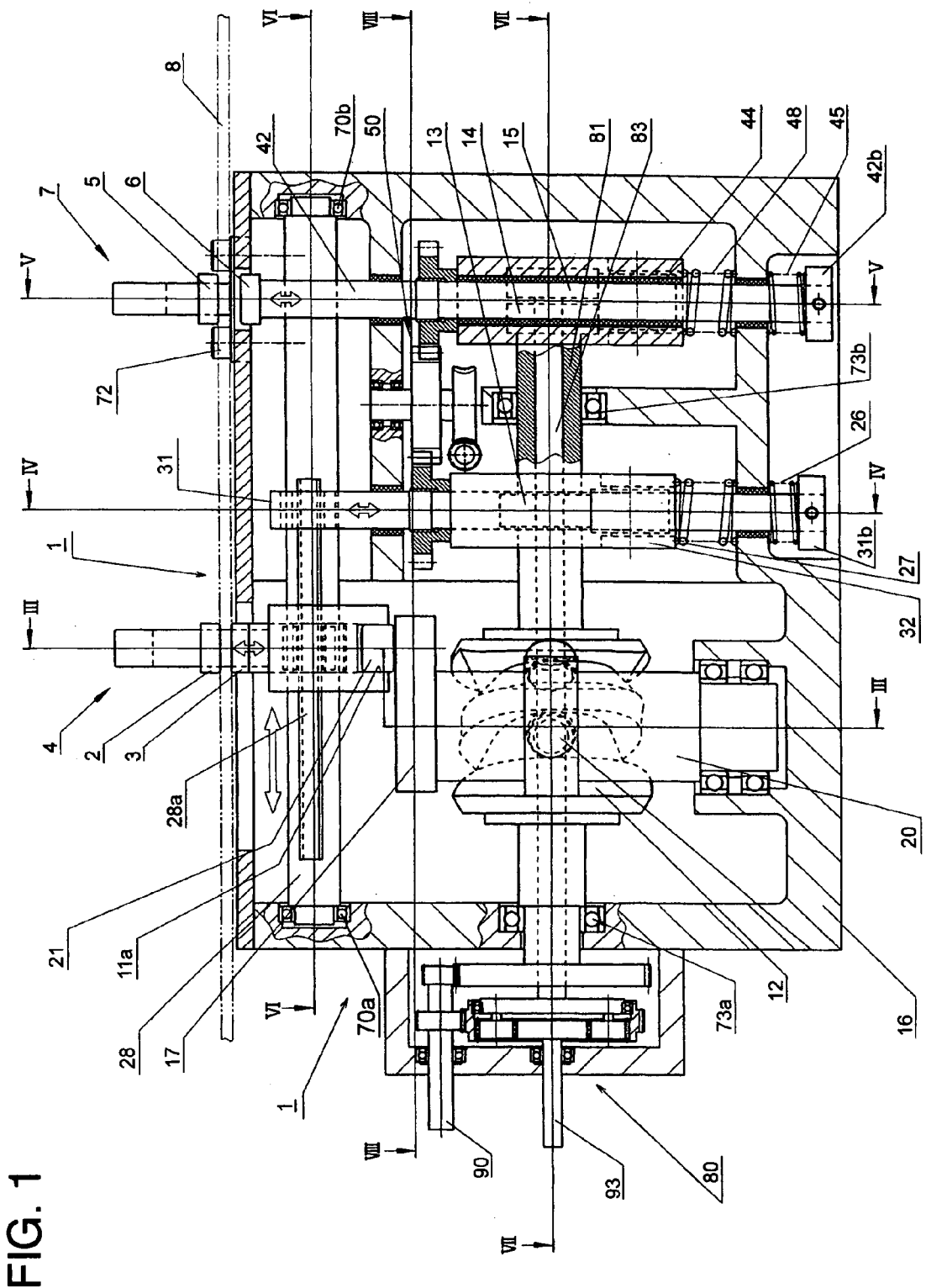
FIG. 1 is a front, cross sectional view showing a whole construction of a material feeding apparatus that incorporates thereinto a power transmission device according to a first embodiment of the invention.

FIG. 1 shows a whole construction of a material feeding apparatus 1 that incorporates thereinto a power transmission device 80 according to a first embodiment of the invention. The material feeding apparatus 1 is suited to the use as an apparatus, by which a plate material for small-sized parts used particularly in an industry of electronic parts is intermittently fed in constant-length steps to a press machine. While the whole construction of the material feeding apparatus 1 will be described in detail later, the power transmission device 80 is first described with reference to FIGS. 1, 11, 12A, and 12B.

(Power Transmission Device)

The power transmission device 80 comprises a hollow, outer shaft 81 rotatably supported on walls of a housing 16 of the material feeding apparatus 1 through bearing members 73a, 73b, and a drive gear 84 is fixed to one end of the outer shaft 81. That wall of the housing 16, to which the bearing member 73a is mounted, also forms a wall of a housing 82 of the power transmission device 80. An inner shaft 83 extends through the drive gear 84 and the outer shaft 81 in the coaxial relationship with the outer shaft 81, and a carrier 85 is fixed to an extension of the inner shaft from the drive gear 84. A sun gear 86 is arranged in the coaxial relationship with the inner shaft 83, and each of a plurality of planetary gears 87 is supported rotatably on each of a plurality of support shafts 88, which are provided on the carrier 85 to project therefrom, and engages with the sun gear 86. In the embodiment as shown, the four planetary gears 87 are arranged at equal intervals around the sun gear 86. Also, internal teeth 89a of a ring gear 89 having the internal teeth 89a and external teeth 89b engage with the planetary gears 87. The sun gear 86, the planetary gears 87, the ring gear 89, and the like constitute a planetary gear mechanism.

A first gear 91 and a second gear 92 are fitted integrally onto an input shaft 90 that is rotationally driven in synchronism with the operation of a press machine, the first gear 91 engaging with the drive gear 84, and the second gear 92 engaging with the external teeth 89b of the ring gear 89.

In the first embodiment, the sun gear 86 includes a rotationally operated shaft 93 that is integral with the sun gear 86 to project from a center thereof in opposition to and in the coaxial relationship with the inner shaft 83. The ring gear 89 is fitted rotatably onto an outer periphery of the carrier 85 through a bearing member 94.

The input shaft 90 and the rotationally operated shaft 93, respectively, are supported rotatably on the wall of the housing 82 through bearing members 98, 99.

The power transmission device 80 thus constructed operates in the following manner.

When the input shaft 90 is rotationally driven in a state, in which the sun gear 86 is stationary, the outer shaft 81 is rotationally driven through the first gear 91 and the drive gear 84. Also, the inner shaft 83 is rotationally driven in the same direction as that in the outer shaft 81 through the second gear 92, the ring gear 89, the planetary gears 87, and the carrier 85. The number of revolutions of the inner shaft 83 at this time is the same as that of the outer shaft 81, so that the inner shaft 83 and the outer shaft 81 are rotationally driven together.

When the rotationally operated shaft 93 is rotated to rotate the sun gear 86, the planetary gears 87 revolve around the sun gear 86 while rotating on their own axes, and the inner shaft 83 is rotated through the carrier 85. Accordingly, a position of the inner shaft 83 in a direction of rotation can be adjusted relative to the outer shaft 81 by regulating rotation of the rotationally operated shaft 93. Such adjustment can be made also in the operation of the power transmission device 80, during which the input shaft 90 is rotated to rotationally drive the outer shaft 81 and the inner shaft 83.

It suffices to determine the numbers of teeth of the respective gears that constitute the planetary gear mechanism, the first and second gears 91, 92, etc. in the following manner.

The following formula (1) is established where $N_1$, $N_2$, $N_3$, respectively, indicate the numbers of revolutions of the rotationally operated shaft 93, the carrier 85, and the ring gear 89, and G and E, respectively, indicate the numbers of teeth of the sun gear 86 and the internal teeth 89a of the ring gear 89.

$$N_1 = \left(\frac{E}{G}+1\right)N_2 - \frac{E}{G}N_3 \qquad (1)$$

Since $N_1$ is 0 in the case where the rotationally operated shaft 93 and the sun gear 86 are stationary, the numbers of revolutions of the carrier 85 and the gear 89 are represented by the following formula (2).

$$\left(\frac{E}{G}+1\right)N_2 = \frac{E}{G}N_3 \qquad (2)$$
$$\frac{N_3}{N_2} = \left(1+\frac{G}{E}\right)$$

When the rotationally operated shaft 93 and the sun gear 86 are stationary, the numbers $N_3$, $N_4$ of revolutions of the ring gear 89 and the drive gear 84 are represented by the following formula (3) in order that the number of revolution of the carrier 85 (that is, the number of revolution of the inner shaft 83) be made the same as the number of revolution of the drive gear 84 (that is, the number of revolution of the outer shaft 81).

$$\frac{N_3}{N_2} = \frac{N_3}{N_4} = \left(1 + \frac{G}{E}\right) \quad (3)$$

In the case where the ring gear 89 and the drive gear 84 are driven by the input shaft 90, the relationship among the number A of teeth of the first gear 91, the number B of teeth of the drive gear 84, the number C of teeth of the second gear 92, and the number D of teeth of the external teeth 89b of the ring gear 89 is represented by the following formula (4).

$$\frac{C}{D} \times \frac{B}{A} = \left(1 + \frac{G}{E}\right) \quad (4)$$

By setting a gear ratio to satisfy the condition (4), when the input shaft 90 is rotated in a state ($N_1=0$), in which the rotationally operated shaft 93 is stopped, the number ($N_2$) of revolutions of the carrier 85 becomes the same as the number ($N_4$) of revolutions of the drive gear 84, so that the inner shaft 83 rotating integrally with the carrier 85 rotates integrally in complete synchronism with the outer shaft 81 that rotates integrally with the drive gear 84.

When the rotationally operated shaft 93 is rotated from this state (that is, rotary input corresponding to $N_1$ is given), the number $N_2$ of revolutions of the carrier 85 is represented by the following formula (5).

Since rotation of the carrier 85 corresponding to rotation of the rotationally operated shaft 93 is brought about in this manner, a position of the inner shaft 83 in the direction of rotation is adjusted relative to the outer shaft 81. Such rotational relationship is established even in both the operation and stoppage of the power transmission device 80.

$$N_1 = \left(\frac{E}{G} + 1\right) N_2 \quad (5)$$

Figure 11:
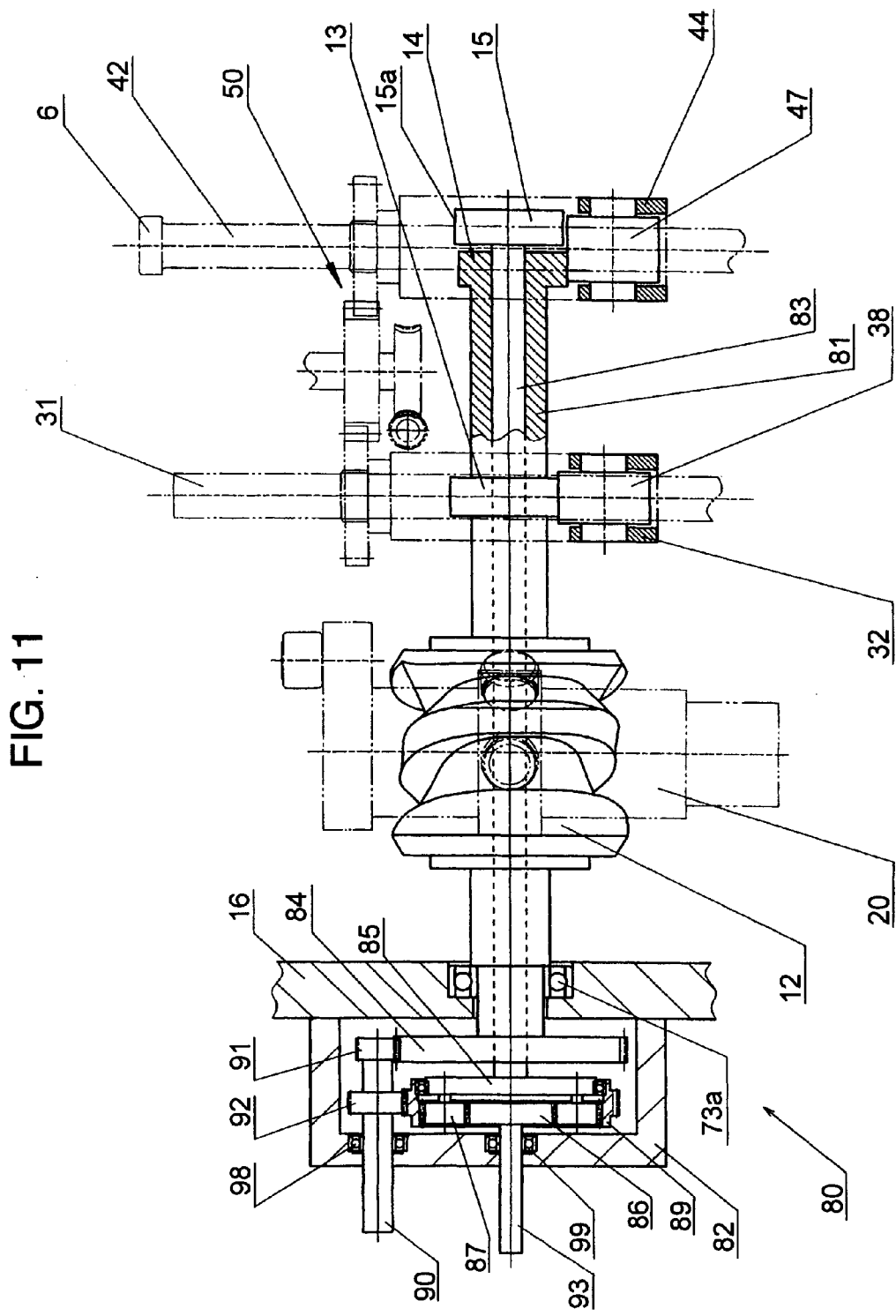
FIG. 11 is a cross sectional view clearly showing the power transmission device shown in FIG. 1.

In the illustrated embodiment, a first cam 14 is fitted integrally onto one end of the outer shaft 81 as clearly shown in FIG. 11. A second cam 15 is fitted integrally onto that portion of the inner shaft 83, which projects from the outer shaft 81. Accordingly, by rotating the rotationally operated shaft 93 to adjust a position of the inner shaft 83 in the direction of rotation relative to the outer shaft 81, it is possible to regulate timing, in which the mechanism is operated by the first cam 14 and the second cam 15.

In the illustrated embodiment, the first cam 14 and the second cam 15 control timing, in which a second movable, lower gripper 6 is moved up and down. A third cam 12 and a fourth cam 13 are also fitted onto the outer shaft 81. These arrangements will be described later in detail.

(Basic Action of the Material Feeding Apparatus)

Figure 2:
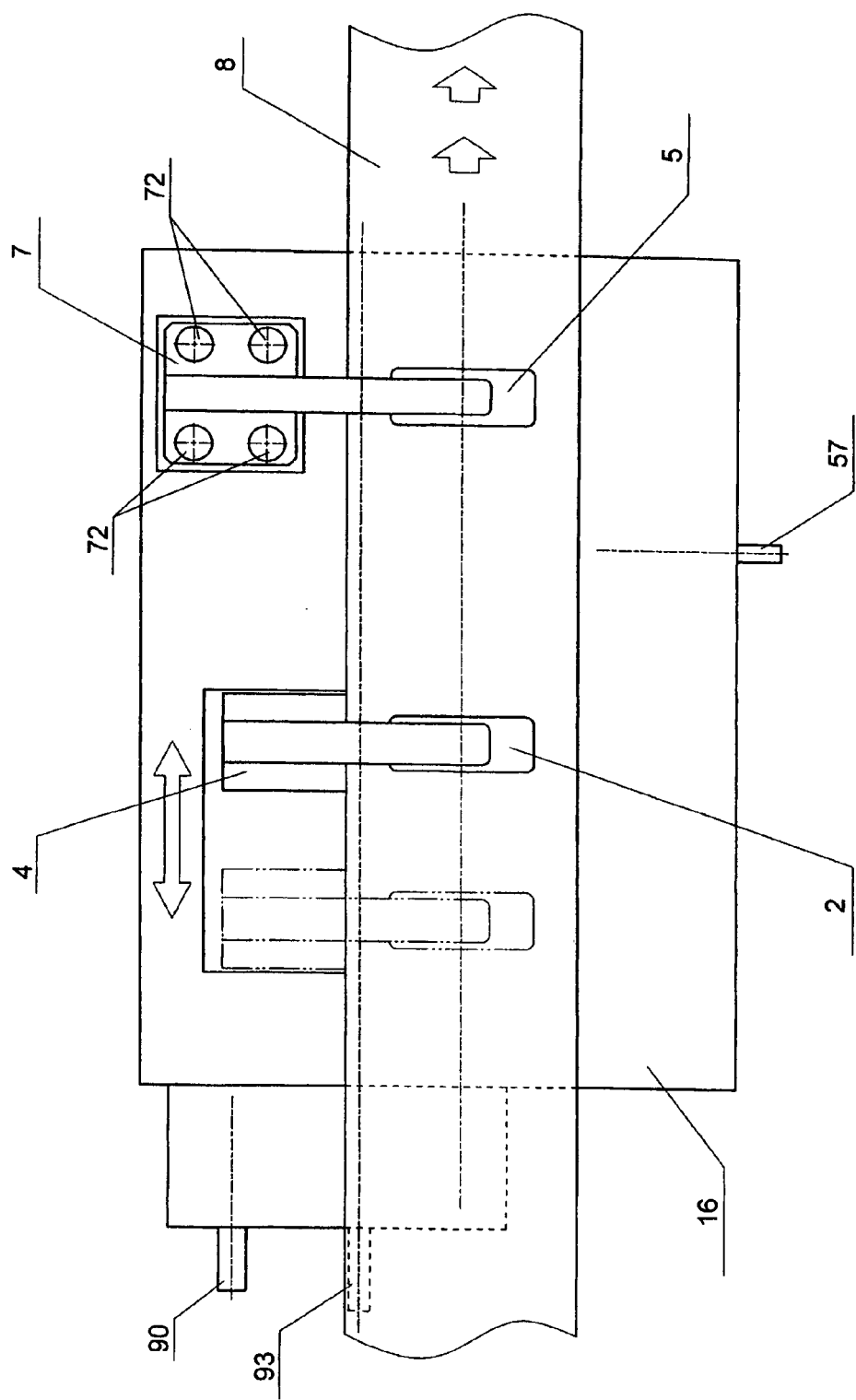
FIG. 2 is a plan view showing the material feeding apparatus.

The plate-material feeding apparatus 1 shown in FIGS. 1 and 2 comprises a first gripper device 4 including a first stationary, upper gripper 2 and a first movable, lower gripper 3 to interpose (grip) therebetween and release a plate material, and a second gripper device 7 including a second stationary, upper gripper 5 and a second movable, lower gripper 6 to interpose (grip) therebetween and release a plate material, the plate-material feeding apparatus serving to feed a plate material to a press machine in intermittent feeding actions. While specific constructions of respective parts of the apparatus will be described later, the basic action of the plate-material feeding apparatus 1 is first described with reference to FIGS. 16A to 16G.

FIG. 16A shows a state, in which a perforating punch 10a formed a positioning hole 8a in a plate material 8 fed to a press machine 9 by the plate-material feeding apparatus 1 (first process), thereafter the plate material 8 further fed by the plate-material feeding apparatus 1 was subjected to press working, that is, blanking by a blanking punch 10c (second process) and formation of a positioning hole 8b by the perforating punch 10a, and a slider 9a of the press machine 9 ascends.

As shown in FIG. 16A, in the plate-material feeding apparatus 1, (1) the first gripper device 4 grips the plate material 8, and (2) the second gripper device 7 releases the plate material 8. Subsequently, as shown in FIG. 16B, (3) the first gripper device 4 moves in a direction, in which the plate material 8 is fed, whereby the plate material 8 interposed between the first stationary, upper gripper 2 and the first movable, lower gripper 3 is fed to the press machine 9. Subsequently, as shown in FIG. 16C, after (4) the second gripper device 7 grips the plate material 8, (5) the first gripper device 4 releases the plate material 8. At this time, the slider 9a mounting an upper metal mold 10A on an underside thereof begins descending toward a lower metal mold 10B. Thereafter, as shown in FIGS. 16D to 16G, the first gripper device 4 moves in a return direction (leftward in the figure) to return to an original position.

While the first gripper device 4 is moving in the return direction, (7) the second gripper device 7 releases the plate material 8 as shown in FIGS. 16D and 16E. In the meantime, the slider 9a of the press machine 9 descends further, so that a pilot pin 10b provided on the upper metal mold 10A passes through the hole 8b of the plate material 8 to be inserted into a receiving hole 10d of the lower metal mold 10B. In this manner, the plate material 8 is positioned between the upper metal mold 10A and the lower metal mold 10B with high accuracy.

Thereafter, (8) the second gripper device 7 interposingly fixs the plate material 8 as shown in FIGS. 16F and 16G. In this state, the slider 9a descends further, so that the blanking punch 10c on the upper metal mold 10A blanks out the plate material 8 and the perforating punch 10a forms a positioning hole 8c on the plate material.

By repeating the series of actions (A) to (G), the plate-material feeding apparatus 1 intermittently feeds the plate material 8 to the press machine 9 (the upper metal mold 10A and the lower metal mold 10B) and the press machine 9 performs press working on the fed plate material.

In addition, the reference numeral 100 in FIG. 16G denotes a product having been subjected to press working and 101 denotes a blanked scrap generated when the positioning hole 8c is formed.

As apparent from the above description, the second gripper device 7 temporarily releases the plate material in states shown in FIGS. 16D and 16E, and the plate material, meanwhile, is positioned in the press machine 9 by insertion of the pilot pin 10b into the hole 8b having been beforehand formed on the plate material.

(Construction and Operation of the Plate-Material Feeding Apparatus)

Figure 7:
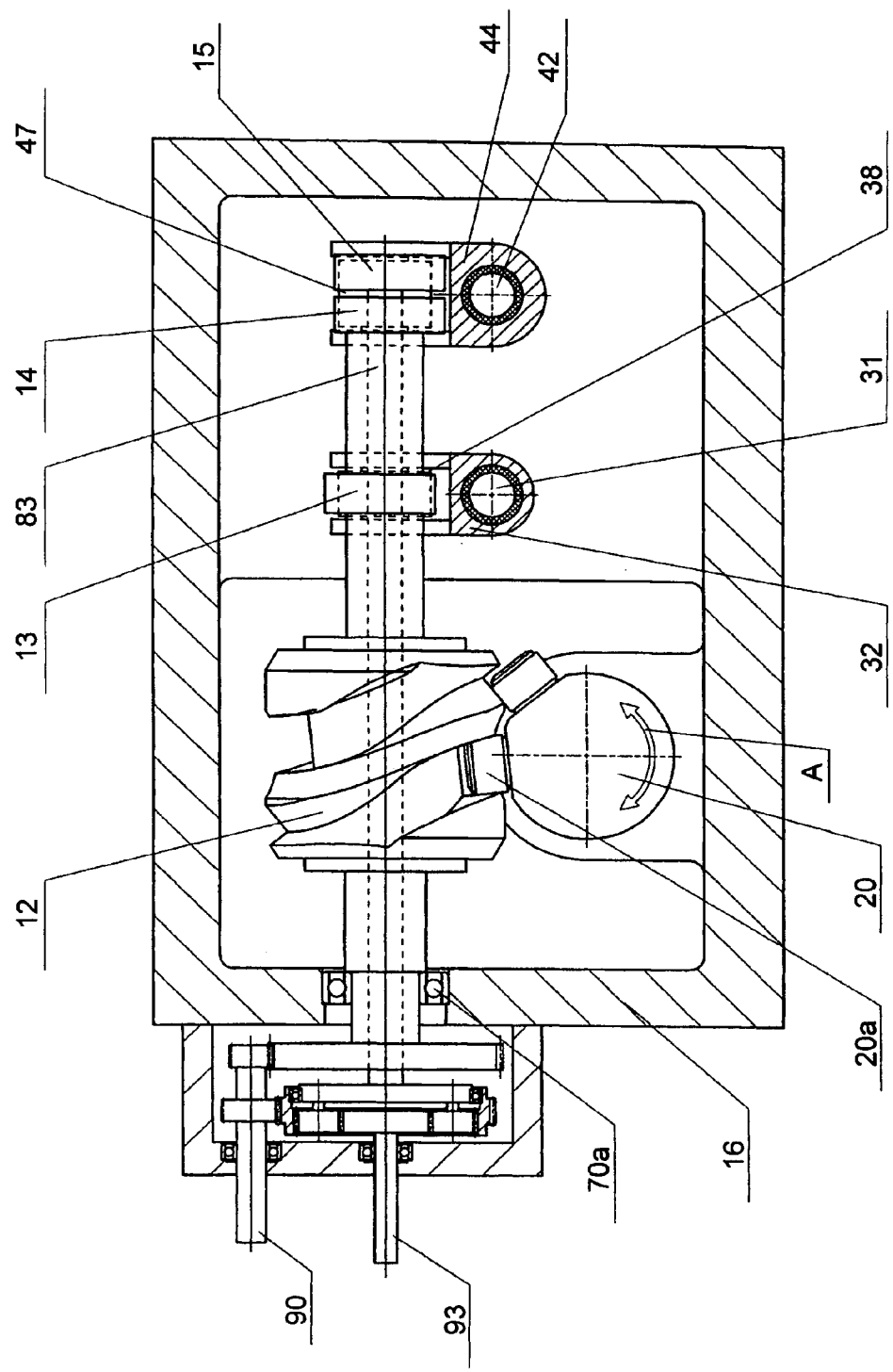
FIG. 7 is a cross sectional view taken along the line VII—VII in FIG. 1.
Figure 8:
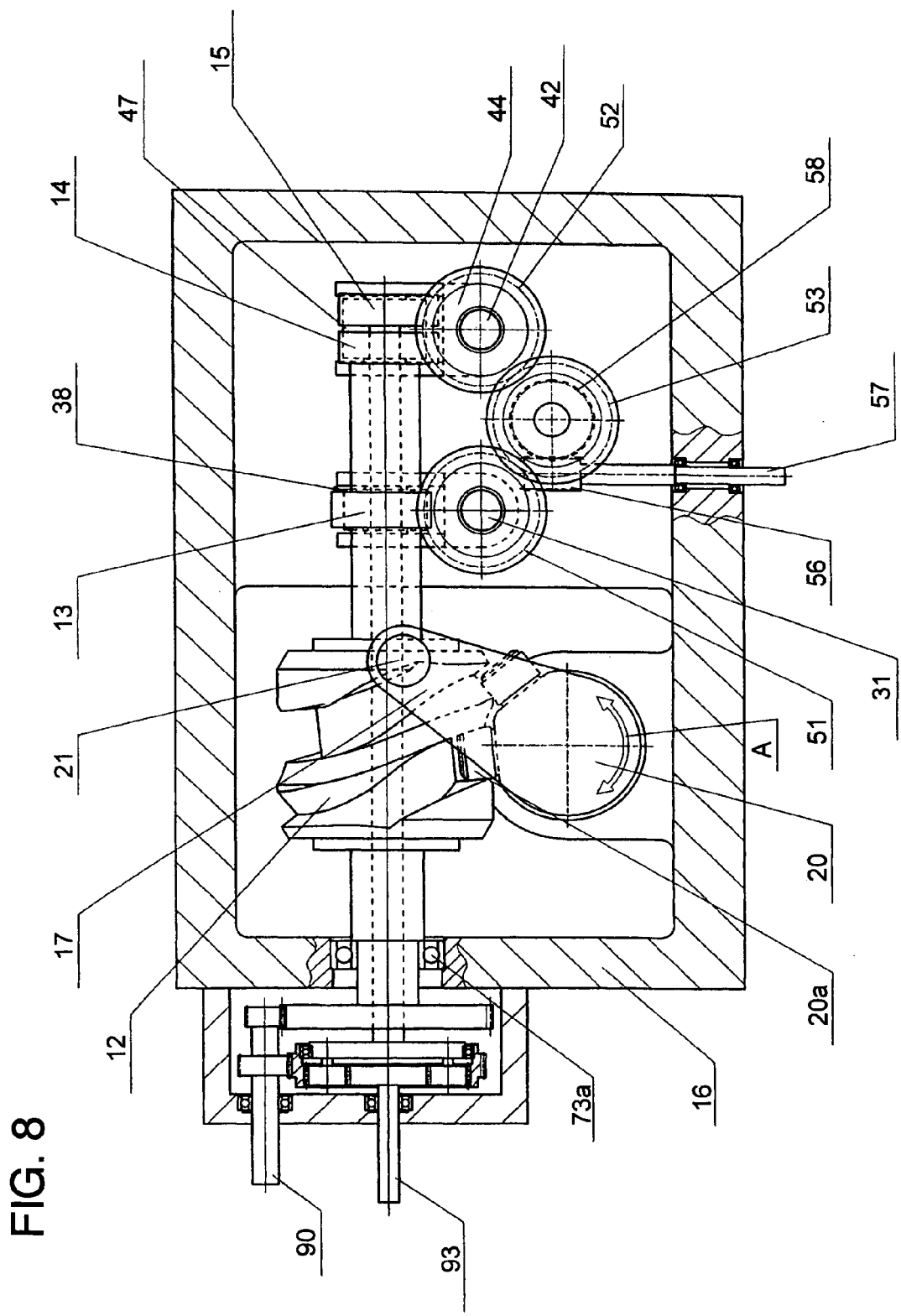
FIG. 8 is a cross sectional view taken along the line VIII—VIII in FIG. 1.

The plate-material feeding apparatus 1 comprises the power transmission device 80, and the power transmission device 80 includes four cams (the first cam 14, the second cam 15, the third cam 12, and the fourth cam 13 ) as seen from FIGS. 1, 7, and 8 in order to cause the first gripper device 4 and the second gripper device 7 to perform the predetermined actions described above. As described above, the first cam 14, the third cam 12, and the fourth cam 13 are fitted integrally onto one end of the outer shaft 81 of the power transmission device 80, and the second cam 15 is fitted integrally onto one end of the inner shaft 83 of the power transmission device 80.

The third cam 12 comprises a roller gear cam formed on a circumferential surface thereof with a tapered rib, both sides of which are defined by cam surfaces. The first cam 14, the second cam 15, and the fourth cam 13 comprise a plate cam, a circumferential surface of which is defined by a cam surface having a predetermined shape so as to move the movable, lower grippers 3, 6 between a grip position, in which material grip portions of the respective movable, lower grippers 3, 6 are made close to material grip portions of the respective stationary, upper grippers 2, 5, and a release position, in which the material grip portions of the movable, lower grippers 3, 6 are made separate from the material grip portions of the stationary, upper grippers 2, 5.

In addition, the aim of that construction, in which the four separate cams 12, 13, 14, 15 perform necessary actions (the reciprocatory motion of the first gripper device 4, the grip/release motion of the first gripper device 4, and the grip/release motion of the second gripper device 7), is to facilitate timing design of the respective parts (respective motions).

Figure 3:
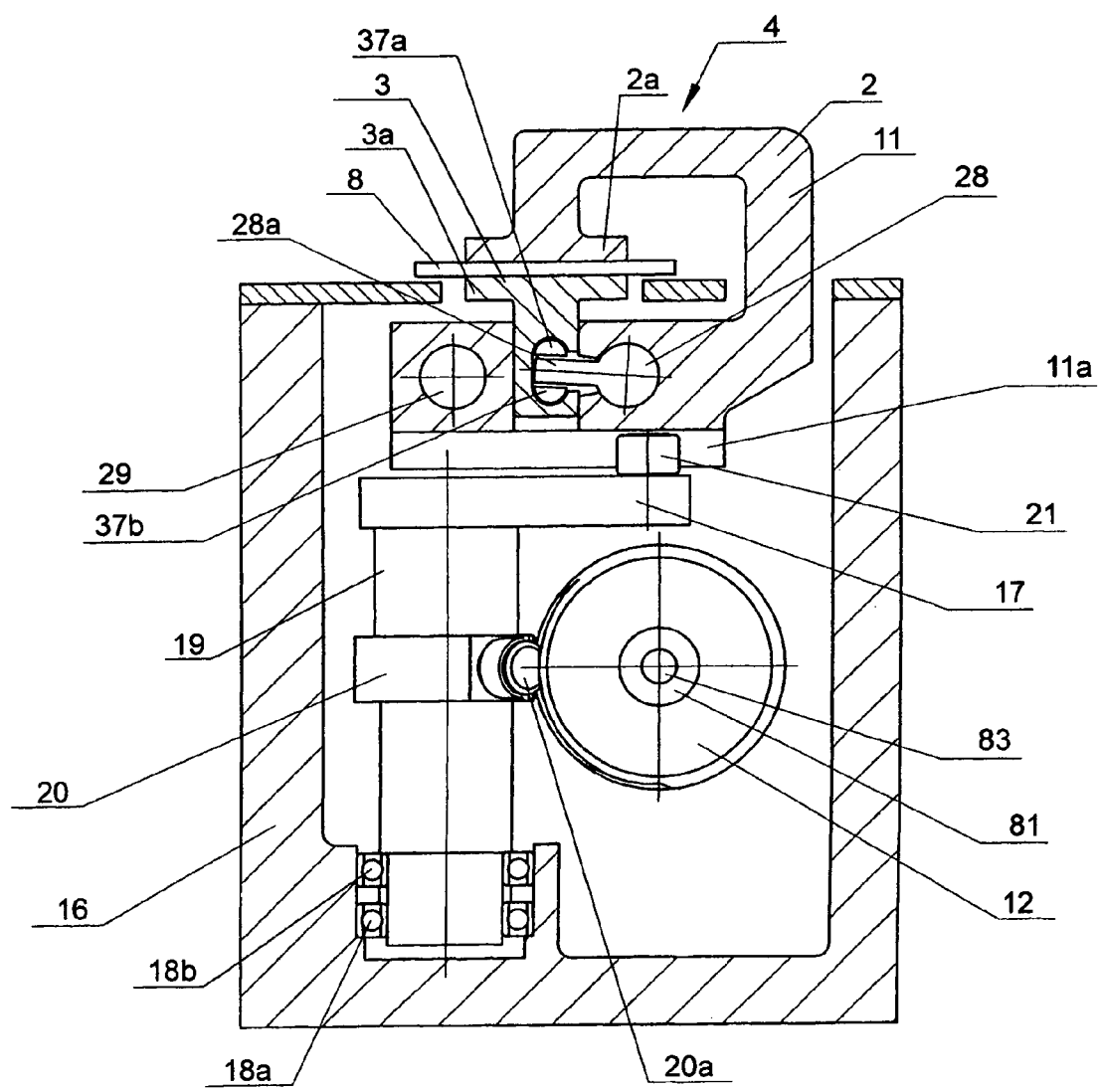
FIG. 3 is a cross sectional view taken along the line III—III in FIG. 1.
Figure 6:
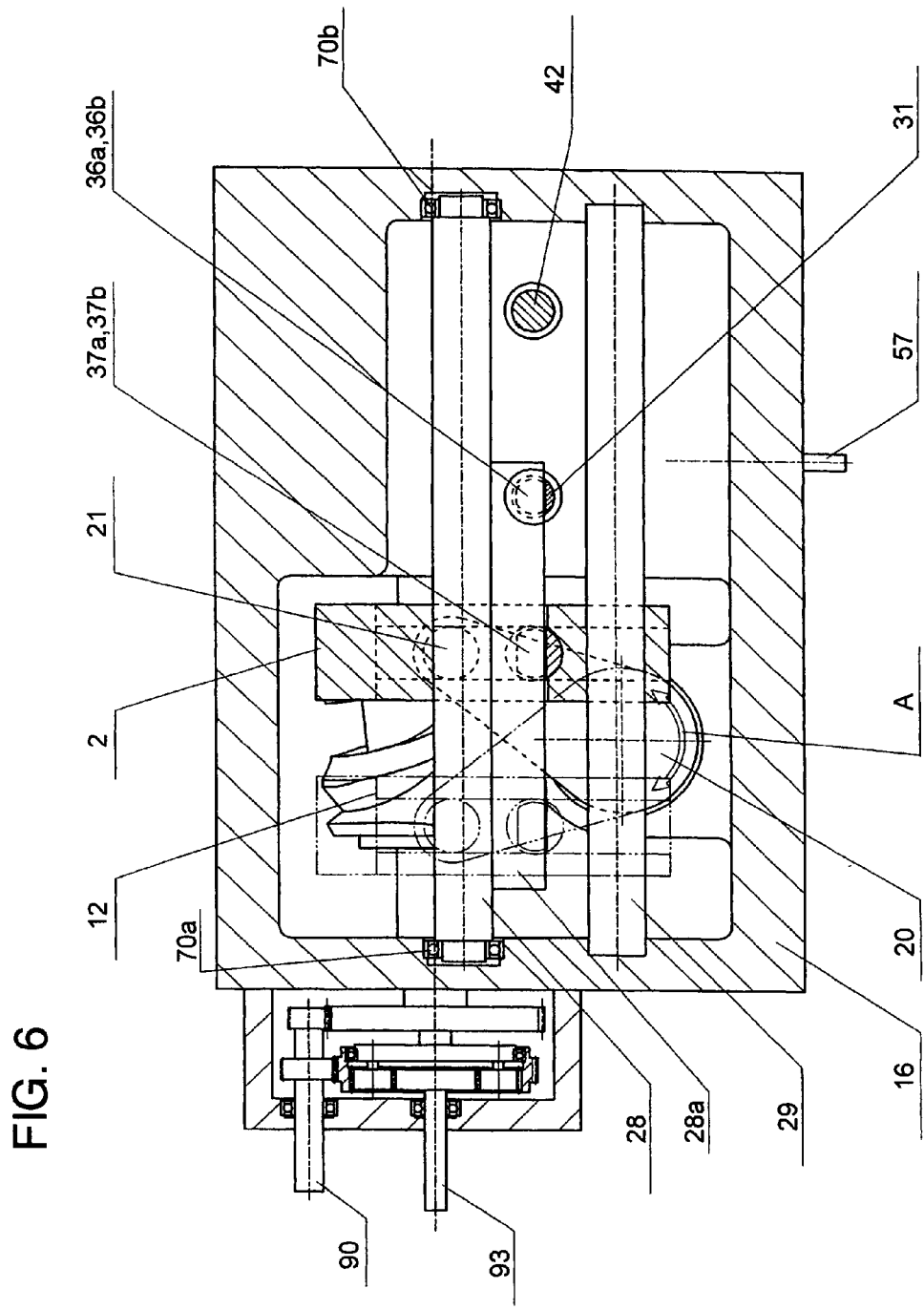
FIG. 6 is a cross sectional view taken along the line VI—VI in FIG. 1.

As shown in FIGS. 3 and 6, the first gripper device 4 includes a slide block portion 11, and the first stationary, upper gripper 2 having a material grip portion 2a is formed integral with the slide block portion 11. The slide block portion 11 is supported on a pair of guide shafts 28, 29, which are arranged along a material conveyance path, to be able to reciprocate. One 28 of the guide shafts is rotatable and has both ends thereof supported on walls of the housing 16 through beating members 70a, 70b. As shown in FIG. 3, the first movable, lower gripper 3 is held vertically movably on the slide block portion 11, and a material grip portion 3a of the first movable, lower gripper 3 is opposed to the material grip portion 2a of the first stationary, upper gripper 2.

As shown in FIGS. 3, 6, and 8, the plate-material feeding apparatus 1 according to the embodiment comprises, as means (first gripper slide device) for operative connection of the third cam 12 and the first gripper device 4, a swing arm 17 that swings as the third cam 12 rotates, and interlocking means (a cam follower 21, a guide groove 11a, etc., described later) that operatively connects between the swing arm 17 and the slide block portion 11 to convert swinging movements of the swing arm 17 into linear movements of the slide block portion 11 along the material conveyance path. As shown in FIGS. 3, and 6 to 8, a turret 20 is fixed to a connection shaft 19, which is rotatably mounted on the housing 16 through bearing members 18a, 18b, to be rotatable therewith. The turret 20 includes a cam follower 20a that engages with the cam surface of the third cam 12. The cam follower 20a rolls on the cam surface of the third cam 12 as the third cam rotates, and swingingly turns the turret 20 and the connection shaft 19, which is integral therewith, as indicated by an arrow A in FIGS. 6 to 8, to swing the swing arm 17 fixed to the connection shaft 19.

The swing arm 17 is provided at a tip end thereof with a cam follower or a rolling top 21. The guide groove 11a is formed on a bottom of the slide block portion 11 to extend in a direction (a right and left direction in FIG. 3) perpendicular to the direction of plate material conveyance and to be opened downward as seen from FIG. 1, and the rolling top 21 engages with the guide groove 11a to be able to roll.

Accordingly, when the third cam 12 rotates together with the outer shaft 81 of the power transmission device 80, the turret 20 and the connection shaft 19 swingingly turn correspondingly whereby the swing arm 17 swings. When the swing arm 17 swings in this manner, the rolling top 21 that engages with the guide groove 11a pushes the slide block portion 11 while rolling. Accordingly, the first gripper device 4 slidingly reciprocates along the guide shafts 28, 29 in the direction of plate material conveyance and in an opposite direction thereto.

Figure 4:
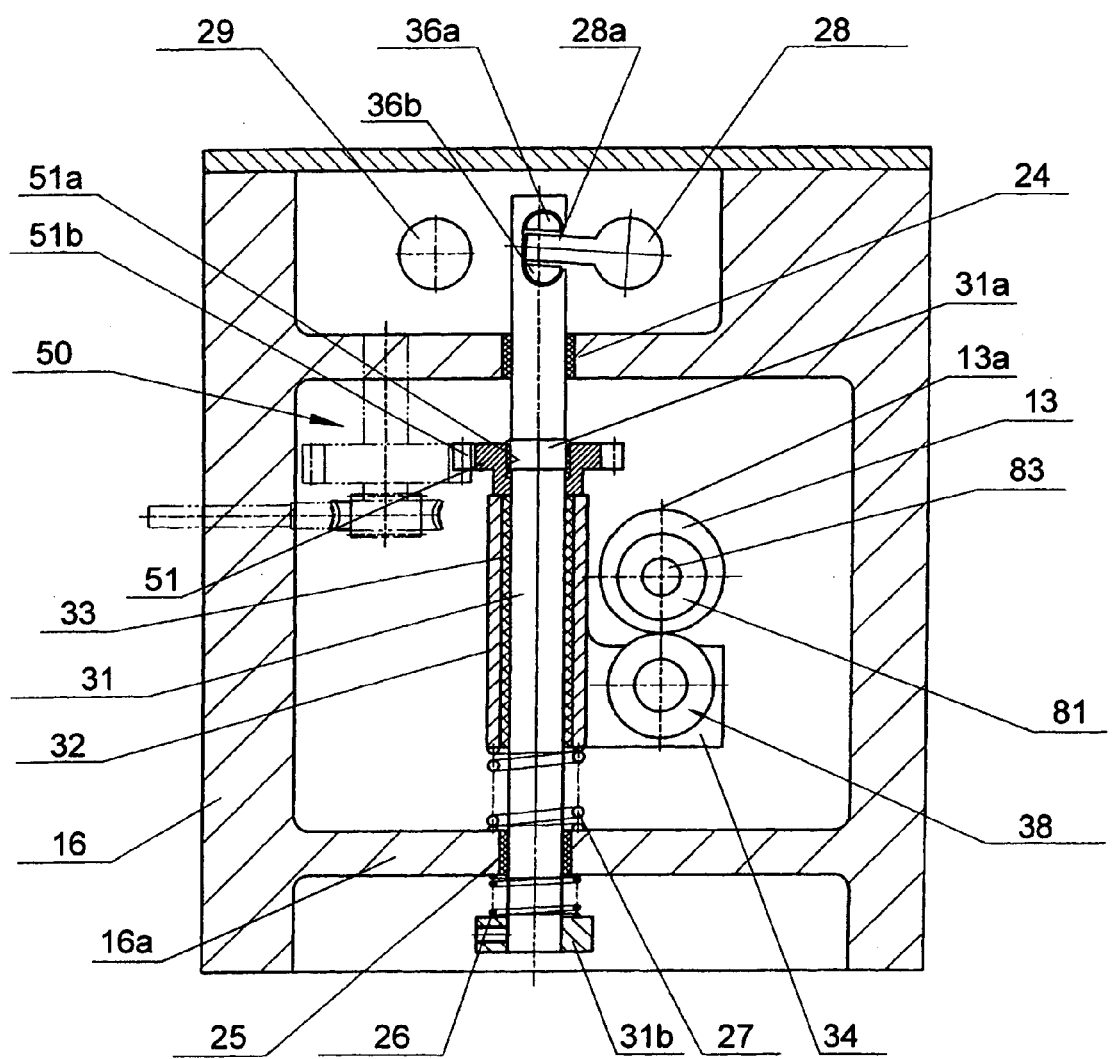
FIG. 4 is a cross sectional view taken along the line IV—IV in FIG. 1.

As shown in FIGS. 1, 3, and 4, a device (first gripper actuating device) for vertical displacement of the material grip portion 3a of the first movable, lower gripper 3 comprises a first slide member 31 supported vertically slidably on the housing 16 through guide members 24, 25. A first actuator 32 is fitted onto the first slide member 31 with a guide member 33 therebetween to be slidable relative thereto. An outer peripheral, threaded portion 31a is provided on the first slide member 31 and an inner peripheral, threaded portion 51a on a first spur gear 51 of a gripper spacing adjustment device 50 described later in detail engages with the outer peripheral, threaded portion 31a. A spring member (third spring member) 26 is mounted around a lower end of the first slide member 31. The third spring member 26 is disposed between a spring support 31b provided on the lower end of the first slide member 31 and a wall portion 16a of the housing 16 to bias the first slide member 31 downward to push a bottom of the first spur gear 51 against a top of the first actuator 32 through the inner peripheral, threaded portion 51a.

A bracket 34 is projectingly provided on the first actuator 32 and a cam follower 38 is mounted on the bracket 34. The cam follower 38 is brought into rolling contact with the fourth cam 13

A spring member (first spring member) 27 is mounted around the first slide member 31 in a position between the wall portion 16a of the housing 16 and the first actuator 32. The first spring member 27 biases the first actuator 32 upward to surely bring the cam follower 38 into contact with the fourth cam 13 and biases the first slide member 31 upward through the first actuator 32 and the first spur gear 51.

As shown in FIGS. 3, 4, and 6, the guide shaft 28 includes an actuating piece 28a projecting radially outward, and an upper end of the first slide member 31 engages with the actuating piece 28a through half moon tops 36a, 36b. The half moon tops 36a, 36b are incorporated between the actuating piece 28a and the first slide member 31 so as to slidably contact with the actuating piece 28a and the first slide member 31.

As described above with reference to FIGS. 3 and 6, the slide block portion 11 slidably engages with the guide shafts 28, 29 and holds the first movable, lower gripper 3 vertically slidably. As shown in FIG. 6, the actuating piece 28a extends over a predetermined distance along the guide shaft 28 and half moon tops 37a, 37b similar to the half moon tops 36a, 36b are incorporated between the first movable, lower gripper 3 and the actuating piece 28a.

The first gripper actuating device operates in the following manner.

In a state shown in FIG. 4, a projection 13a of the fourth cam 13 is positioned in an upper position. When the fourth cam 13 is rotated together with the outer shaft 81 and the inner shaft 83 until the projection 13a comes to a lower position, the first slide member 31 moves downward against the bias of the first spring member 27 through the cam follower 38, the bracket 34, the first actuator 32, and the first spur gear 51. When the first slide member 31 moves in this manner, the guide shaft 28 turns counter-clockwise in FIG. 4 through the half moon tops 36a, 36b and the actuating piece 28a.

When the actuating piece 28a turns in this manner, the first movable, lower gripper 3 that engages with the actuating piece 28a through the half moon tops 37a, 37b moves downward. Accordingly, the material grip portion 3a of the first movable, lower gripper 3 separates from the material grip portion 2a of the first stationary, upper gripper 2 to release a plate material 8.

When the fourth cam 13 is further rotated until the projection 13a again comes to the upper position shown in FIG. 4, the first slide member 31 moves upward owing to the bias of the first spring member 27 through the first actuator 32 and the first spur gear 51.

Accordingly, the first movable, lower gripper 3 moves upward through the half moon tops 36a, 36b, 37a, 37b, etc., and the material grip portion 3a approaches the material grip portion 2a of the first stationary, upper gripper 2 to grip a plate material 8.

In addition, also in the case where the first spring member 27 is set to be very large in spring force, no excessive grip force is applied to a plate material as far as a spacing between the material grip portions 2a, 3a is appropriate. A larger spring force than needed is born by the fourth cam 13 through the cam follower 38.

Figure 5:
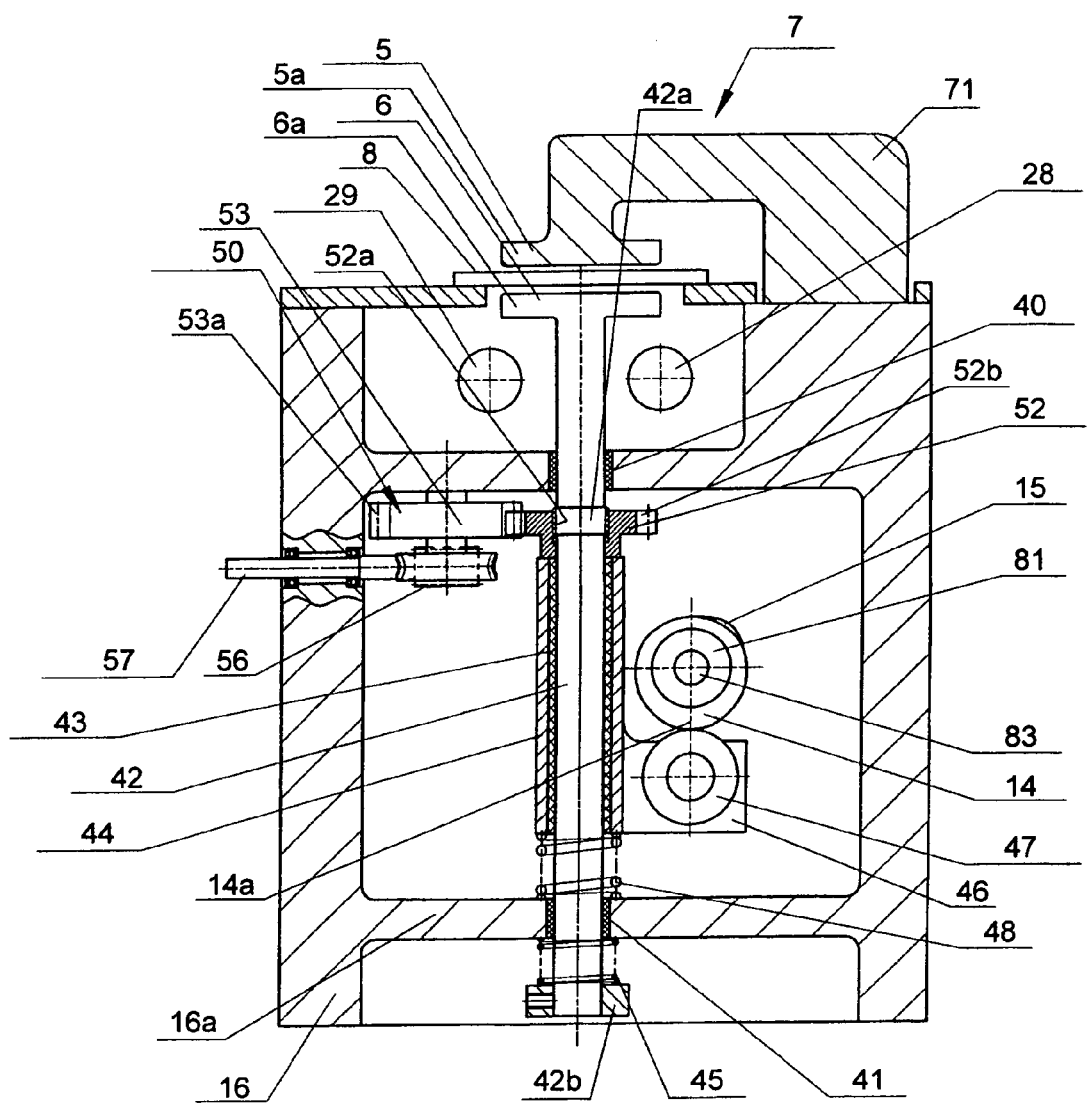
FIG. 5 is a cross sectional view taken along the line V—V in FIG. 1.

As shown in FIGS. 1, 2, and 5, the second stationary, upper gripper 5 of the second gripper device 7 comprises a stationary block portion 71 fixed to the housing 16 by means of bolts 72 and a material grip portion 5a is formed integral with the stationary block portion 71.

A device (second gripper actuating device) for vertical displacement of a material grip portion 6a of the second movable, lower gripper 6 comprises a second slide member 42 supported vertically slidably on the housing 16 through guide members 40, 41. A second actuator 44 is fitted onto the second slide member 42 with a guide member 43 therebetween to be slidable relative thereto. An outer peripheral, threaded portion 42a is provided on the second slide member 42 and an inner peripheral, threaded portion 52a on a second spur gear 52 of the gripper spacing adjustment device 50 engages with the outer peripheral, threaded portion 42a. A spring member (fourth spring member) 45 is mounted around a lower end of the second slide member 42. The fourth spring member 45 is disposed between a spring support 42b provided on the lower end of the second slide member 42 and the wall portion 16a of the housing 16 to bias the second slide member 42 downward to push a bottom of the second spur gear 52 against a top of the second actuator 44 through the inner peripheral, threaded portion 42a.

The second slide member 42 is structured to be integral with the second movable, lower gripper 6, and the material grip portion 6a of the second movable, lower gripper 6 is provided on a top of the second slide member 42.

A bracket 46 is projectingly provided on the second actuator 44 and a cam follower 47 is mounted on the bracket 46. In particular, as apparently shown in FIG. 11, the first cam 14 fitted onto the outer shaft 81 is arranged adjacent to the second cam 15 fitted onto the inner shaft 83. As described later, the cam follower 47 is pushed downward by projections 14a, 15a when the projection 14a of the first cam 14 comes to a lower position (see FIG. 10B) and the projection 15a of the second cam 15 comes to a lower position (see FIG. 10C).

A spring member (second spring member) 48 is mounted around the second actuator 44 in a position between the wall portion 16a of the housing 16 and the second actuator 44. The second spring member 48 biases the second actuator 44 upward to bias the second slide member 42 upward through the second spur gear 52.

The second gripper actuating device operates in the following manner.

First, directing attention to the first cam 14, the projection 14a of the first cam 14 is in a lower position in a state shown in FIGS. 5 and 10B. When the first cam 14 together with the outer shaft 81 is rotated from this state until the projection 14a comes to the upper position, the second slide member 42 moves upward owing to the bias of the second spring member 48 through the second actuator 44 and the second spur gear 52. Accordingly, the second movable, lower gripper 6 moves upward and the material grip portion 6a approaches the material grip portion 5a of the second stationary, upper gripper 5 to grip a plate material (see FIG. 10A).

When the first cam 14 is further rotated until the projection 14a thereof again comes to the lower position shown in FIGS. 5 and 10B, the second slide member 42 moves downward against the bias of the second spring member 48 through the cam follower 47, the bracket 46, the second actuator 44, and the second spur gear 52. Accordingly, the second movable, lower gripper 6 moves downward and the material grip portion 6a separates from the material grip portion 5a of the second stationary, upper gripper 5 to release a plate material 8.

When the first cam 14 fitted onto the outer shaft 81 is rotated, the second cam 15 fitted onto the inner shaft 83 is rotated in the same direction as that of the first cam 14 with the same number of revolutions as that of the first cam 14. When rotation of the second cam 15 causes the projection 15a of the second cam 15 to come to the lower position shown in FIG. 10C, the second cam 15 pushes down the cam follower 47. Accordingly, the second slide member 42 moves downward against the bias of the second spring member 48 through the bracket 46, the second actuator 44, and the second spur gear 52, and the material grip portion 6a separates from the material grip portion 5a to release a plate material 8.

When the second cam 15 is further rotated to bring about a state, in which the projection 15a leaves the lower position, the cam follower 47 moves upward and the second slide member 42 also moves upward, so that the material grip portions 5a, 6a interposes therebetween a plate material.

In this manner, the second cam 15 temporarily releases a plate material as shown in FIGS. 16D to 16F.

As apparent from the above, the cam follower 47 is pushed downward by the projections 14a, 15a when the projection 14a of the first cam 14 comes to the lower position and the projection 15a of the second cam 15 comes to the lower position. When the projections 14a, 15a are in other positions than the lower positions, the cam follower 47 suffices to contact with either of the first cam 14 and the second cam 15. Also, it does not matter whether the cam follower 47 contacts with both the first cam 14 and the second cam 15 at this time.

Like the first spring member 27, in the case where the second spring member 48 is set to be very large in spring force, no excessive grip force is applied to a plate material as far as a spacing between the material grip portions 5a, 5a is appropriate. A larger spring force than needed is born by the first cam 14 or the second cam 15, or both of them through the cam follower 47.

As described above, owing to the operation of the first gripper actuating device, the first gripper device 4 can move along the material conveyance path. Also, owing to the operation of the first and second gripper actuating devices, the first and second gripper devices 4, 7 perform grip/release motions of a plate material. Timing, in which the first gripper slide device and the first and second gripper actuating devices operate, can be appropriately set by appropriately determining the shapes of the cam surfaces of the first, second, third, and fourth cams 14, 15, 12, and 13.

When a position of the second cam 15 in the direction of rotation is adjusted relative to the first cam 14 by rotating the sun gear 86 of the power transmission device 80 to rotate the inner shaft 83 relative to the outer shaft 81, it is possible to appropriately adjust timing, in which the second movable, lower gripper 6 is lowered by the second cam 15, that is, timing, in which a plate material is temporarily released just before press working.

In addition, while according to the illustrated embodiment, the second gripper device 7 making no movements along the material conveyance path is arranged in a position downstream of the first gripper device 4 in the direction of material conveyance, the second gripper device 7 can be arranged upstream of the first gripper device 4.

Subsequently, the gripper spacing adjustment device 50 will be described.

As shown in FIGS. 1, 4, 5, 8, and 9, the gripper spacing adjustment device 50 comprises the first spur gear 51 having outer teeth 51b and the inner peripheral, threaded portion 51a, the second spur gear 52 having outer teeth 52b and the inner peripheral, threaded portion 52a, and a third spur gear 53 having outer teeth 53a that engages with the outer teeth 51b, 52b of the first and second spur gears 51, 52. As described above, the inner peripheral, threaded portion 51a of the first spur gear 51 and the inner peripheral, threaded portion 52a of the second spur gear 52, respectively, engage with the outer peripheral, threaded portions 31a, 42a formed on the first and second slide members 31, 42.

Figure 9:
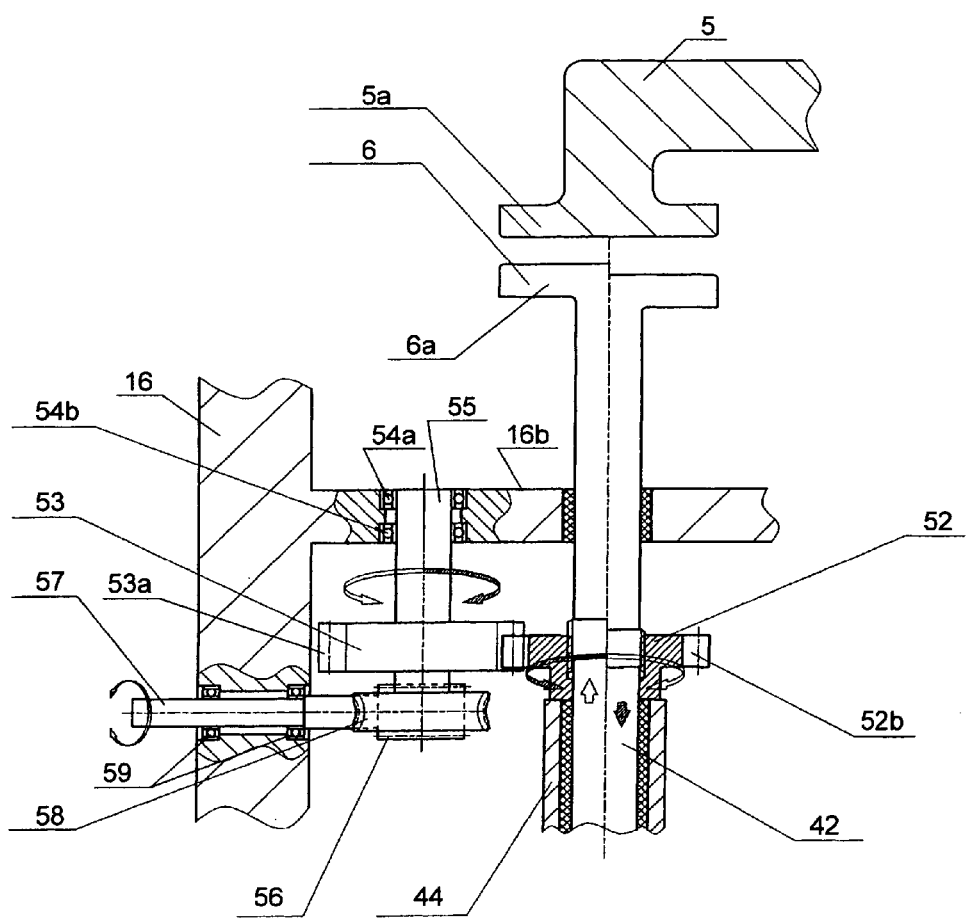
FIG. 9 is a cross sectional view showing a gripper spacing adjustment device of the material feeding apparatus.

As shown in FIG. 9, the third spur gear 53 is fitted and mounted on a rotating shaft 55 mounted on a wall portion 16b of the housing 16 through bearing members 54a, 54b. A worm wheel 56 is fitted and mounted on a lower end of the rotating shaft 55 and a worm 58 provided integrally on an inner end of an adjustment shaft 57 engages with the worm wheel 56. The adjustment shaft 57 is mounted on a wall portion of the housing 16 through bearing members 59 and projects outside the housing 16 so as to afford the rotational operation from outside.

The gripper spacing adjustment device 50 is constructed in the manner described above, and when the adjustment shaft 57 is rotated, the third spur gear 53 is rotated through the worm 58, the worm wheel 56, and the rotating shaft 55, and the first and second spur gears 51, 52 rotate correspondingly.

Thus, when the first and second spur gears 51, 52 rotate, the first and second slide members 31, 42 with the outer peripheral, threaded portions 31a, 42a engaging with the inner peripheral, threaded portions 51a, 52a of the first and second spur gears 51, 52 are displaced upward or downward. Accordingly, the material grip portions 3a, 6a of the first and second movable, lower grippers 3, 6 are displaced up and down, so that a spacing between the material grip portions 2a, 5a of the first and second stationary, upper grippers 2, 5 is adjusted. When such adjustment is made, spring forces of the first spring members 27, 48 are varied, so that grip forces applied to a plate material are also adjusted.

In addition, when the material grip portion 3a of the first movable, lower gripper 3 is displaced upward, the material grip portion 6a of the second movable, lower gripper 6 is also displaced upward, and when the material grip portion 3a is displaced downward, the material grip portion 6a is also displaced downward. In this manner, a spacing between the material grip portions 2a, 3a and a spacing between the material grip portions 5a, 6a are adjusted at the same time.

FIG. 9 shows the second slide member 42 in an upper position (see a left half) and in a lower position (see a right half).

When the first and second slide members 31, 42 are displaced upward or downward corresponding to the actuation of the first cam 14, the second cam 15, and the fourth cam 13, except the occasion of adjustment of a spacing by the gripper spacing adjustment device 50, the first and second spur gears 51, 52 are displaced vertically relative to the third spur gear 53 fixed in the vertical direction. Since the gears 51, 52, 53 are spur gears, relative displacements among the gears are made possible. Since the spur gears 51, 52, 53 perform the relative displacements while rotating, adjustment can be made by rotating the adjustment shaft 57 while seeing a state of material feed in the operation of the material feeding apparatus.

(Second Embodiment)

Figure 13:
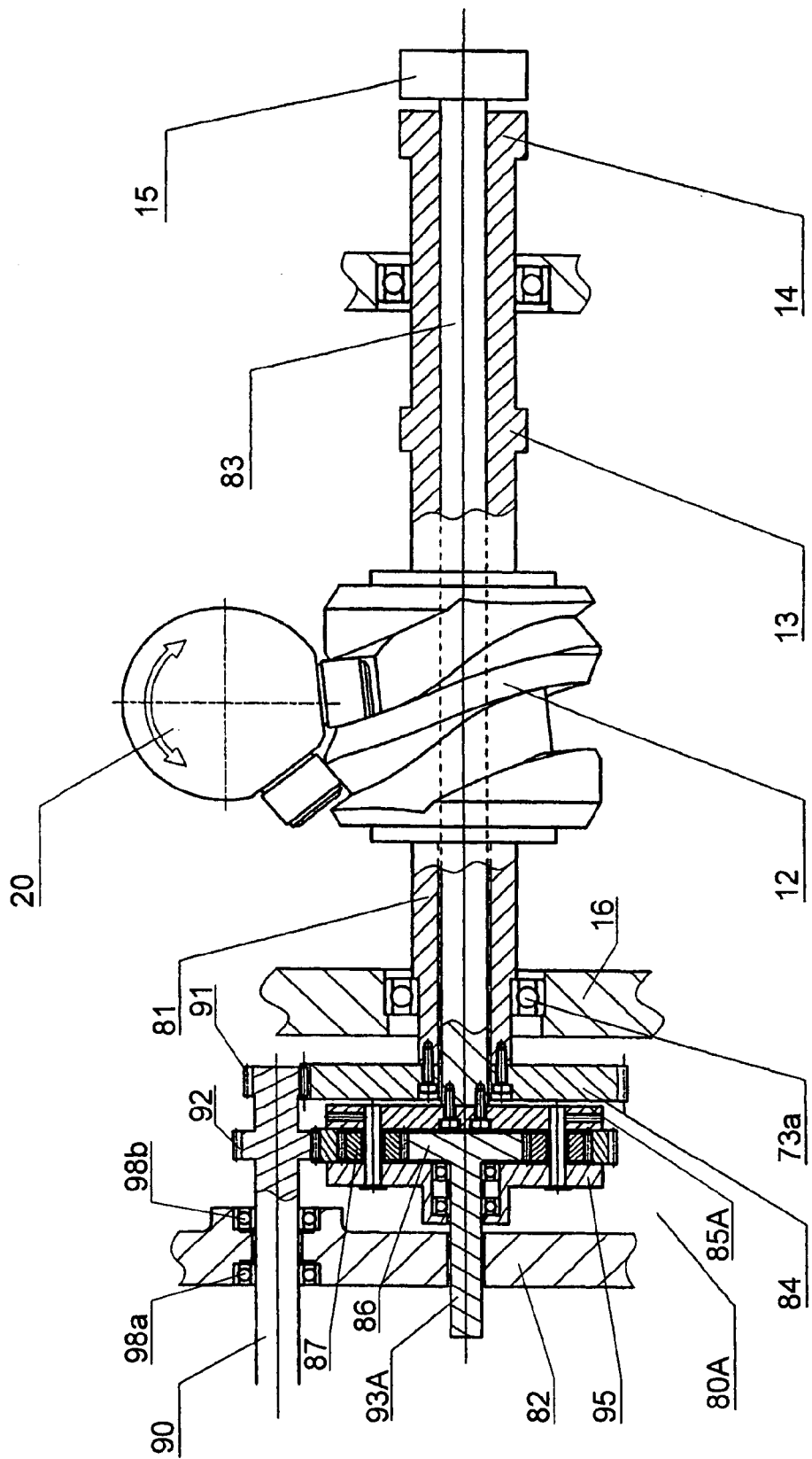
FIG. 13 is a cross sectional view, similar to FIG. 11, showing a power transmission device according to a second embodiment of the invention.
Figure 14A:
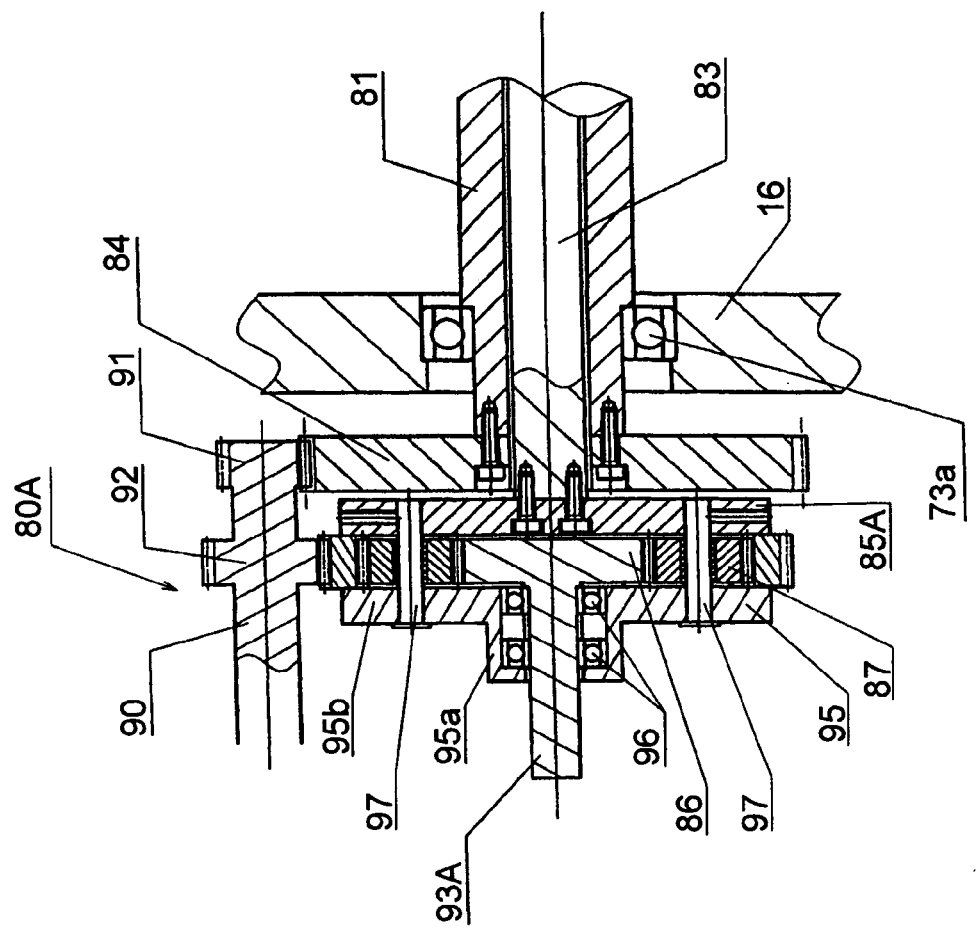
FIG. 14A is a cross sectional view showing details of the vicinity of a planetary gear mechanism of the power transmission device shown in FIG. 11
Figure 14B:
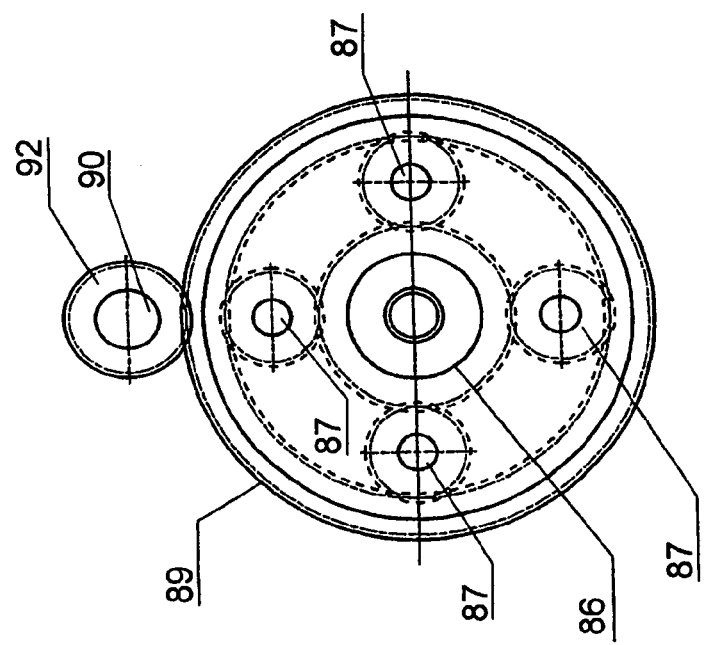
FIG. 14B is a left side view showing the details.

A power transmission device 80A, according to a second embodiment, shown in FIGS. 13, 14A, and 14B comprises a support member 95. The support member 95 comprises a support 95a that rotatably supports a rotationally operated shaft 93A through bearing members 96, and a disk 95b opposed to a carrier 85A. The disk 95b is connected to the carrier 85A through a plurality of connection shafts 97. Both end surfaces of the sun gear 86, the planetary gears 87, and the ring gear 89 are held between the carrier 85A and the disk 95b. The connection shafts 97 serve as support shafts for the planetary gears 87, and each of the planetary gears 87 is rotatably supported on each of the connection shafts 97.

An input shaft 90 is supported on a wall portion of a housing 82 through bearing members 98a, 98b. The rotationally operated shaft 93A is made integral with the sun gear 86 to extend from a center of the sun gear 86 coaxially with and in a direction opposed to the inner shaft 83 to project outside from the wall portion of the housing 82. No bearing member is provided between the wall portion of the housing 82 and the rotationally operated shaft 93A.

Figure 12:
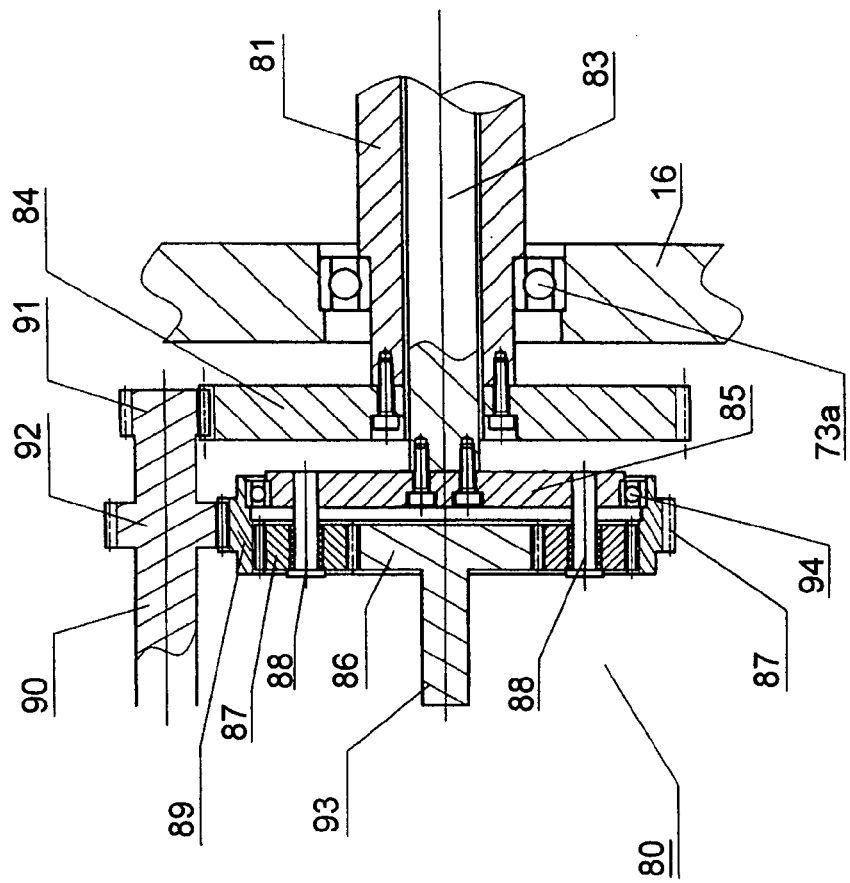
FIG. 12A is a cross sectional view showing details of the vicinity of a planetary gear mechanism of the power transmission device shown in FIGS. 10A to 10C.
FIG. 12B is a left side view showing the details.

Other constituents of the second embodiment than those described above are the same as those of the first embodiment, and the same elements in FIGS. 13, 14A, and 14B as those in FIGS. 11, 12A, and 12B are denoted by the same reference numerals as those in the latter.

In the first embodiment, the bearing member 94 is provided on the outer periphery of the carrier 85 integral with the inner shaft 83 to support the ring gear 89 and the bearing member 99 is provided on the wall portion of the housing 82 to support the rotationally operated shaft 93.

In the second embodiment, the bearing members 94, 99 are omitted. As compared with the construction of the first embodiment, the construction of the second embodiment has an advantage that axes of the inner shaft 83 and the rotationally operated shaft 93A, that is, centers of rotation of the both shafts are easily made in agreement with each other.

(Third Embodiment)

Figure 15:
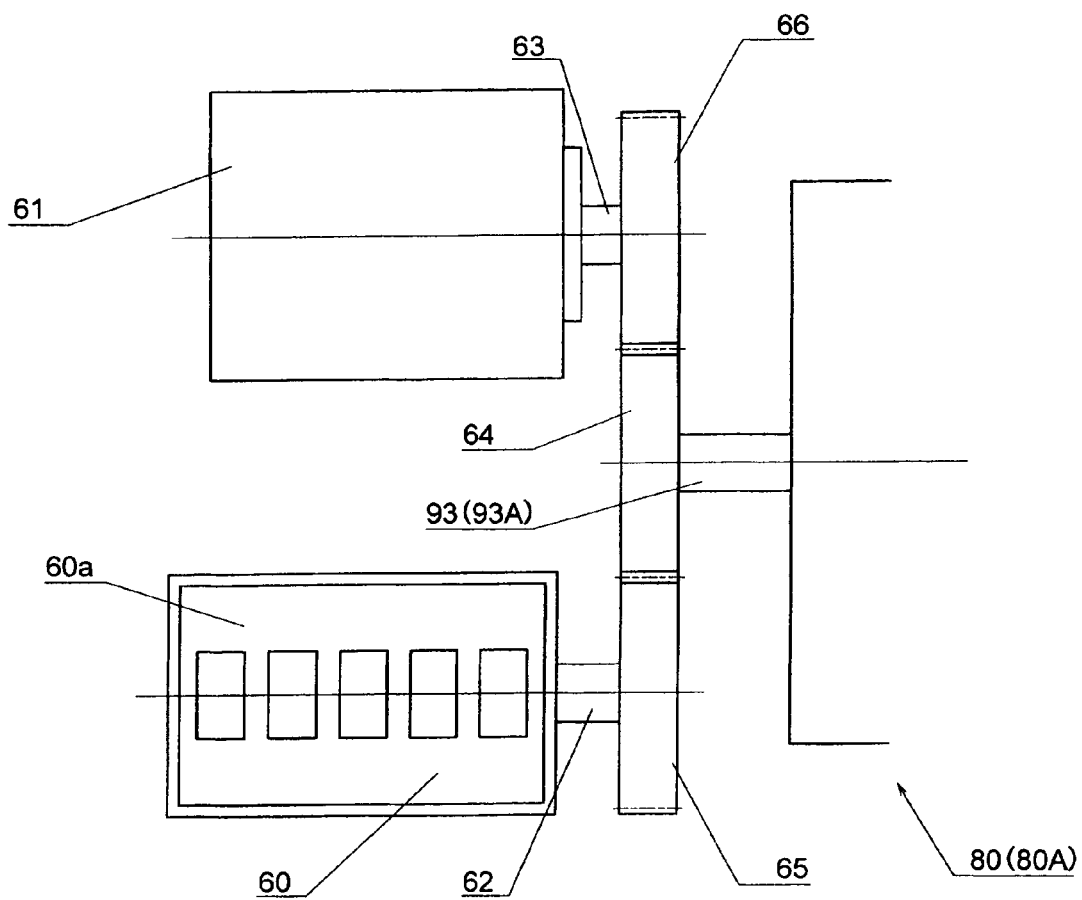
FIG. 15 is a schematic view showing a power transmission device according to a third embodiment of the invention.

In a third embodiment shown in FIG. 15, a rotating angle display device 60 having a display portion 60a is connected to the rotationally operated shaft 93 of the power transmission device 80 according to the first embodiment. A motor 61 is provided as drive means for the rotationally operated shaft 93. A gear 64 is fitted and mounted on a tip end of an adjusting shaft 93, the gear 64 engaging with a gear 65 fitted and mounted on an input shaft 62 of the rotating angle display device 60, and a gear 66 fitted and mounted on an output shaft 63 of the motor 61.

The rotating angle display device 60 enables visually recognizing a relative rotating angle of the inner shaft 83 relative to the outer shaft 81, that is, a relative rotating angle of the second cam 15 relative to the first cam 14. For example, by setting a rotating angle of the second cam 15 relative to the first cam 14 to 0 to 360 degrees and displaying a numerical value corresponding to 0 to 360 degrees on the display portion 60a, timing, in which the second cam 15 is actuated to release a plate material, can be easily adjusted.

Also, the provision of the motor 61 as in the third embodiment enables manipulation of a push button or the like to rotate the rotationally operated shafts 93, 93A and also remote control of the rotationally operated shafts 93, 93A, or the like.

In addition, the construction of the third embodiment is also applicable to the power transmission device 80A according to the second embodiment. Thus, FIG. 15 also shows the reference characters 80A, 93A indicative of the power transmission device and the rotationally operated shaft thereof in the second embodiment.

The invention claimed is:

1. A power transmission device comprising
a hollow, outer shaft, to one end of which a drive gear is fixed,
an inner shaft extending through the drive gear and the outer shaft in the coaxial relationship with the outer shaft and having a carrier fixed to an extension thereof from the drive gear,
a planetary gear mechanism comprising a sun gear arranged in the coaxial relationship with the inner shaft, a plurality of planetary gears supported rotatably on the carrier to engage with the sun gear, and a ring gear having internal teeth and external teeth, the internal teeth engaging with the planetary gears, and
an input shaft having a first gear that engages with the drive gear, and a second gear that engages with the external teeth of the ring gear,
the arrangement being such that the outer shaft and the inner shaft are rotated with the same number of revolutions in the same direction when the sun gear is kept stationary and the input shaft is rotationally driven, and that a position of the inner shaft in a direction of rotation is adjusted relative to the outer shaft when the sun gear is rotated.

2. A power transmission device according to claim 1, further comprising a first cam fitted integrally onto the outer shaft and a second cam fitted integrally onto that portion of the inner shaft, which projects from the outer shaft.

3. A power transmission device according to claim 1, further comprising a rotationally operated shaft integral with the sun gear to project from a center thereof in an opposite direction to and in the coaxial relationship with the inner shaft.

4. A power transmission device according to claim 3, wherein the ring gear is fitted rotatably onto an outer periphery of the carrier and the rotationally operated shaft is supported rotatably on a housing of the power transmission device.

5. A power transmission device according to claim 3, further comprising a support member having a support that rotatably supports the rotationally operated shaft, and a disk opposed to the carrier, the disk being connected to the carrier through a plurality of connection shafts, and wherein both end surfaces of the sun gear, the planetary gears, and the ring gear are held between the carrier and the disk of the support member, and the respective planetary gears are rotatably supported on the respective connection shafts.

6. A power transmission device according to claim 3, further comprising a rotating angle display device connected to the rotationally operated shaft.

7. A plate-material feeding apparatus comprising
a first gripper device having a first stationary upper gripper and a vertically movable, first movable lower gripper interposing therebetween a plate material to intermittently feed the same to a press machine,
a second gripper device that lifts a second movable lower gripper during a period of time, in which the operation of feeding a plate material to the press machine is not performed, to have the second movable lower gripper and a second stationary upper gripper interposingly fixing a plate material, and that lowers the second movable lower gripper to temporarily release the plate material just before the plate material fed to the press machine is subjected to press working, and
a power transmission device having a first cam and a second cam to cause the lifting and lowering of the second movable lower gripper, respectively, and wherein the power transmission device comprises
a hollow, outer shaft, to one end of which a drive gear is fixed, and on which the first cam is fitted integrally,
an inner shaft extending through the drive gear and the outer shaft in the coaxial relationship with the outer shaft and having a carrier fixed to an extension thereof from the drive gear, the second cam being fitted integrally on an extension thereof from the outer shaft,
a planetary gear mechanism comprising a sun gear arranged in the coaxial relationship with the inner shaft, a plurality of planetary gears supported rotatably on the carrier to engage with the sun gear, and a ring gear having internal teeth and external teeth, the internal teeth engaging with the planetary gears, and
an input shaft having a first gear that engages with the drive gear, and a second gear that engages with the external teeth of the ring gear,
the arrangement being such that the outer shaft and the inner shaft are rotated with the same number of revolutions in the same direction when the sun gear is kept stationary and the input shaft is rotationally driven, and that timing, in which the second cam lowers the second movable lower gripper, is adjusted when the sun gear is rotated to adjust a position of the inner shaft in a direction of rotation relative to the outer shaft.

8. A plate-material feeding apparatus according to claim 7, further comprising a rotationally operated shaft integral with the sun gear to project from a center thereof in an opposite direction to and in the coaxial relationship with the inner shaft.

9. A plate-material feeding apparatus according to claim 8, wherein the ring gear is fitted rotatably onto an outer periphery of the carrier and the rotationally operated shaft is supported rotatably on a housing of the power transmission device.

10. A plate-material feeding apparatus according to claim 8, further comprising a support member having a support that rotatably supports the rotationally operated shaft, and a disk opposed to the carrier, the disk being connected to the carrier through a plurality of connection shafts, and wherein both end surfaces of the sun gear, the planetary gears, and the ring gear are held between the carrier and the disk of the support member, and the respective planetary gears are rotatably supported on the respective connection shafts.

11. The plate-material feeding apparatus according to claim 8, further comprising a rotating angle display device connected to the rotationally operated shaft.

* * * * *

UNITED STATES PATENT AND TRADEMARK OFFICE
CERTIFICATE OF CORRECTION

| | | |
|---|---|---|
| PATENT NO. | : 7,229,380 B2 | Page 1 of 1 |
| APPLICATION NO. | : 11/120109 | |
| DATED | : June 12, 2007 | |
| INVENTOR(S) | : Heizaburo Kato | |

It is certified that error appears in the above-identified patent and that said Letters Patent is hereby corrected as shown below:

Column 9, line 38, "beating" should be --bearing--.

Signed and Sealed this

Seventh Day of August, 2007

JON W. DUDAS
*Director of the United States Patent and Trademark Office*